United States Patent [19]

Maezawa et al.

[11] Patent Number: 5,608,136
[45] Date of Patent: Mar. 4, 1997

[54] METHOD AND APPARATUS FOR PYROLYTICALLY DECOMPOSING WASTE PLASTIC

[75] Inventors: Yukishige Maezawa, Tokyo; Terunobu Hayata; Hideki Shimada, both of Kanagawa-ken; Isao Ito, Chiba-ken; Kazuo Suzuki, Tokyo; Masahiro Tadauchi, Tokyo; Fuminobu Tezuka, Tokyo; Jiro Kano, Tokyo, all of Japan

[73] Assignee: Kabushiki Kaisha Toshiba, Kawasaki, Japan

[21] Appl. No.: 262,185

[22] Filed: Jun. 20, 1994

Related U.S. Application Data

[63] Continuation-in-part of Ser. No. 992,761, Dec. 18, 1992, abandoned.

[30] Foreign Application Priority Data

| Dec. 20, 1991 | [JP] | Japan | 3-338183 |
| Feb. 21, 1992 | [JP] | Japan | 4-033814 |
| Feb. 21, 1992 | [JP] | Japan | 4-035334 |
| Oct. 14, 1992 | [JP] | Japan | 4-275763 |
| Sep. 13, 1993 | [JP] | Japan | 5-227589 |
| Sep. 13, 1993 | [JP] | Japan | 5-227596 |
| Sep. 14, 1993 | [JP] | Japan | 5-229311 |
| Dec. 28, 1993 | [JP] | Japan | 5-336905 |

[51] Int. Cl.$^6$ ............................ C10B 57/00; A62D 3/00
[52] U.S. Cl. .................... 588/228; 585/241; 201/2.5; 588/213; 588/216
[58] Field of Search .................. 423/481, 488; 585/241, 407; 201/2.5; 588/226, 213, 216, 228; 208/415, 427

[56] References Cited

U.S. PATENT DOCUMENTS

| 3,829,558 | 8/1974 | Banks et al. | 423/488 |
| 4,031,192 | 6/1977 | Häfeli | 423/481 |
| 5,326,919 | 7/1994 | Paisley et al. | 585/241 |

*Primary Examiner*—Gary P. Straub
*Assistant Examiner*—Stuart L. Hendrickson
*Attorney, Agent, or Firm*—Foley & Lardner

[57] ABSTRACT

Disclosed is a method and an apparatus for pyrolytically decomposing waste plastic, e.g. PVC, to recover light fuel oil. The invention enables to prevent the product from contamination by halogen compounds. The plastic is first thermally decomposed in an atmosphere of a normal or reduced pressure to produce a primary decomposition product in the form of gas and a decomposition residue. The primary decomposition product is cooled at a first cooling temperature to separate the primary decomposition product into a relatively light fraction containing a desired light constituent and a relatively heavy fraction by condensation of the relatively heavy fraction, and the relatively heavy fraction is then thermally decomposed in an atmosphere pressurized at a predetermined pressure to produce a secondary decomposition product containing the desired light constituent in the form of gas. The relatively light fraction and the secondary decomposition product are cooled at a second cooling temperature to condense a fraction containing the desired light constituent. This method may be changed so that the first and second thermal decomposition steps are performed at the same high pressure in one vessel and the heavy fraction is circulated. Additionally, alkali treatment of time plastic to be decomposed or the decomposition gas, thermal pretreatment of the plastic and addition of water or catalyst to the plastic can be used. The decomposition apparatus which is so systematized that the decomposition can be continuously performed is shown.

11 Claims, 13 Drawing Sheets

METHOD AND APPARATUS FOR PYROLYTICALLY DECOMPOSING WASTE PLASTIC

This application is a continuation-in-part application from U.S. patent application Ser. No. 07/992,761 filed on Dec. 18, 1992, which is now abandoned.

BACKGROUND OF THE INVENTION

1. Field of the Invention

The present invention relates to a method and an apparatus for pyrolytically decomposing waste plastic, and in particular to a technique for efficiently producing high quality fuel oil by using pyrolysis of waste plastic.

2. Description of the Prior Art

Conventionally, plastic materials have been widely used for manufacturing domestic electric appliances and other various articles because of their advantageous features of light weight and prominent strength, but the cycle of manufacturing and consuming the plastic materials has been resulted in producing a huge amount of waste plastic articles, and such waste plastic articles have required to be burned or buried for settlement at present. More recently, however, since the legislation of a law for realizing recycling use in 1991 in Japan, the public interest in Japan has been increasingly attracted toward the recycling use and re-exploitation of waste plastic products.

Now, the plastic comes in a great variety, and one piece of plastic article is manufactured, in general, by using various kinds of plastic. However, each kind of plastic requires a different treatment method to be employed for the purpose of facilitating the re-exploitation. To this end, it is necessary for the waste plastic articles to be separated into various components in accordance with kinds of plastic involved, but such a work is troublesome, and it also seems practically difficult to perform such a work completely. As a result, it has been inevitable for the quality and value of the recovered products to be reduced because of this incomplete separation. In more difficult cases, it is impossible to put the reclamation into practice.

In such a circumstance, a technique of dry distillation of the waste plastic has attracted much attention, because this technique has a possibility to reclaim the waste plastic articles into a product having a relatively high value. However, such a dry distillation technique requires a high cost at present, and it is also necessary to further improve the recovering efficiency in this technique. Moreover, in a case of dealing with a thermoplastic material such as polystyrene, polypropylene and the like, which has a low heat conductivity, it is difficult to achieve a quick and uniform heating of a large volume of articles made of the thermoplastic, and the oil obtained from such a thermoplastic source contains a great variety of constituents whose boiling points are widely distributed. Accordingly, in a practical application of the dry distillation technique, it is also necessary to improve the quality of the obtained oil.

As a method for improving the oil quality. Japanese Laid-Open Patent Publication (Kokai) Nos. S63-178195 and H2-29492 propose to use a vapour phase reaction catalyst such as zeolite and the like for the purpose of improving the oil quality. However, in the apparatus for carrying out this method, it is necessary to heat the thermal decomposition section and the oil quality improvement section separately. As a result, this apparatus requires a large space for its installation and a high driving cost.

Furthermore, when a waste plastic mixture containing polyvinyl chloride resin (which will be referred as a PVC resin hereinafter) is thermally decomposed, a corrosive hydrogen chloride gas is generated and this damages a wall of the thermal decomposition furnace. In addition, some products resulting from the decomposition of a plasticizing agent contained in the PVC resin often function to choke the gas flow in a piping system of the decomposition apparatus.

As described above, the conventional method for thermally decomposing waste plastic has been associated with problems concerning poor oil quality and recovery yield for the obtained fuel oil and a need to provide a protection against the damage due to the generation of hydrogen chloride and decomposed products from the plasticizer material to the apparatus for thermal decomposition.

SUMMARY OF THE INVENTION

It is therefore an object of the present invention to provide a method of pyrolytically decomposing plastic materials capable of recovering a high quality fuel oil from waste plastic articles efficiently, It is another object of the present invention to provide an apparatus for pyrolytically decomposing plastic materials to recover a high quality fuel oil from waste plastic articles efficiently.

It is another object of the present invention to provide an apparatus which enables to successively perform pyrolytic decomposition of plastic materials.

It is also an object of the present invention to provide an apparatus which enables to easily remove the decomposition residue from the decomposition reactor after or during the operation of decomposition.

The foregoing object is accomplished in the present invention by providing a process for pyrolytically decomposing a plastic material, comprising: a first thermal decomposition step for thermally decomposing the plastic in an atmosphere of a normal or reduced pressure to produce a primary decomposition product in the form of gas and a decomposition residue; a first cooling step for cooling the primary decomposition product at a first cooling temperature to separate the primary decomposition product into a first fraction containing a desired light constituent and a second fraction being heavy relative to the first fraction, by condensation of the second fraction; a second thermal decomposition step for thermally decomposing the second fraction of the primary decomposition product in an atmosphere pressurized at a predetermined pressure to produce a secondary decomposition product containing the desired light constituent in the form of gas; and a second cooling step for cooling the first fraction and the secondary decomposition product at a second cooling temperature to condense a fraction containing the desired light constituent.

Moreover, the pyrolytic decomposition method according to the present invention comprises: a first thermal decomposition step for thermally decomposing the plastic in an atmosphere of a normal pressure to produce a primary decomposition product in the form of gas and a decomposition residue; a first cooling step for cooling the primary decomposition product at a first cooling temperature to separate the primary decomposition product into a first fraction containing a desired light constituent and a second fraction being heavy relative to the first fraction, by condensation of the second fraction: a second thermal decomposition step for thermally decomposing the second fraction of the primary decomposition product in an atmosphere pressurized at a predetermined pressure to produce a secondary decomposition product containing the desired light constituent in the form of gas; and a second cooling step for cooling the first fraction and the secondary decomposition product at a second cooling temperature to condense a fraction containing the desired light constituent.

Another pyrolytic decomposition method according to the present invention is useable for decomposition of plastic containing polyvinyl chloride and comprises: a first thermal decomposition step for thermally decomposing the plastic in an atmosphere of a normal or reduced pressure to produce a primary decomposition product in the form of gas and a decomposition residue; a first cooling step for cooling the primary decomposition product at a first cooling temperature to separate the primary decomposition product into a first fraction containing a desired light constituent and a second fraction being heavy relative to the first fraction, by condensation of the second fraction; a second thermal decomposition step for thermally decomposing the second fraction of the primary decomposition product in an atmosphere pressurized at a predetermined pressure to produce a secondary decomposition product containing the desired light constituent in the form of gas; and a second cooling step for cooling the first fraction and the secondary decomposition product at a second cooling temperature to condense a fraction containing the desired light constituent.

Moreover, the pyrolytic decomposition method according to the present invention is usable for decomposition of plastic containing polyvinyl chloride and comprises: a first thermal decomposition step for thermally decomposing the plastic containing polyvinyl chloride in an atmosphere of a normal pressure to produce a decomposition residue and a primary decomposition product which may contain hydrogen chloride; an alkali treatment step for treating the primary decomposition product with an alkali material to substantially remove the hydrogen chloride from the primary decomposition product; and a second thermal decomposition step for thermally decomposing the primary decomposition product, after the alkali treatment step, in an atmosphere pressurized at a predetermined pressure to produce a secondary decomposition product which is lighter than the primary decomposition product and contains a desired light constituent.

Moreover, the pyrolytic decomposition method according to the present invention is usable for decomposition of plastic containing polyvinyl chloride and comprises: a heating step for heating the plastic containing polyvinyl chloride in the presence of an alkaline material to produce hydrogen chloride from the polyvinyl chloride, wherein the hydrogen chloride is neutralized by the alkaline material; a first thermal decomposition step for thermally decomposing the plastic in an atmosphere of a normal or reduced pressure to produce a primary decomposition product in the form of gas and a decomposition residue; a first cooling step for cooling the primary decomposition product at a first cooling temperature to separate the primary decomposition product into a first fraction containing a desired light constituent and a second fraction being heavy relative to the first fraction, by condensation of the second fraction; a second thermal decomposition step for thermally decomposing the second fraction of the primary decomposition product in an atmosphere pressurized at a predetermined pressure to produce a secondary decomposition product containing the desired light constituent in the form of gas; and a second cooling step for cooling the first fraction and the secondary decomposition product at a second cooling temperature to condense a fraction containing the desired light constituent.

Moreover, the pyrolytic decomposition method according to the present invention comprises the steps of: thermally decomposing plastic in a pressurized atmosphere to produce a pyrolysis product in the form of gas; cooling the pyrolysis product obtained at the thermally decomposing step so that the pyrolysis product is separated into a first fraction containing a desired light constituent and a second fraction being heavy relative to the first fraction, by condensation of the second fraction; feeding back the second fraction separated at the cooling step to the thermally decomposing step so that the second fraction is further thermally decomposed; and recovering the desired light constituent by collecting the first fraction.

The pyrolytic decomposition apparatus according to the present invention comprises: a first thermal decomposition device for thermally decomposing the plastic in an atmosphere of a normal or reduced pressure to produce a primary decomposition product in the form of gas and a decomposition residue; a first condenser for cooling the primary decomposition product at a first cooling temperature to separate the primary decomposition product into a first fraction containing a desired light constituent and a second fraction being heavy relative to the first fraction, by condensation of the second fraction; a second thermal decomposition device for thermally decomposing the second fraction of the primary decomposition product in an atmosphere pressurized at a predetermined pressure to produce a secondary decomposition product containing the desired light constituent in the form of gas; and a second condenser for cooling the first fraction and the secondary decomposition product at a second cooling temperature to condense a fraction containing the desired light constituent.

Another pyrolytic decomposition apparatus according to the present invention comprises a thermal decomposition device for thermally decomposing the plastic to produce a decomposition product and a decomposition residue, the thermal decomposition device comprising: an inner vessel for containing the plastic; an outer vessel which can removably receive the inner vessel therein; and a heater for heating the outer vessel, the outer vessel having a heat transmitting portion which fittingly contacts with the inner vessel when the outer vessel and the inner vessel are heated for improving heat transmission between the outer vessel and inner vessel.

Moreover, the pyrolytic decomposition apparatus according to the present invention, which is usable for decomposition of plastic containing PVC, comprises: a first thermal decomposition device for thermally decomposing the plastic to produce a primary decomposition product and a decomposition residue; a first condenser for cooling the primary decomposition product at a first cooling temperature to separate the primary decomposition product into a first fraction containing a desired light constituent and a second fraction being heavy relative to the first fraction, by condensation of the second fraction; a second thermal decomposition device for thermally decomposing the second fraction of the primary decomposition product in an atmosphere pressurized at a predetermined pressure to produce a secondary decomposition product containing the desired light constituent in the form of gas; and a second condenser for cooling the first fraction and the secondary decomposition product at a second cooling temperature to condense a fraction containing the desired light constituent, wherein each of the first and second thermal decomposition devices comprises an inner vessel, an outer vessel which can removably receive the inner vessel therein and a heater for heating the outer vessel, the outer vessel having a heat transmitting portion which fittingly contacts with the inner vessel when the outer vessel and the inner vessel are heated for improving heat transmission between the outer vessel and inner vessel.

Moreover, the pyrolytic decomposition apparatus according to the present invention comprises: a heater for heating the plastic to melt the plastic; a mixer for uniformly mixing the melted plastic with water and the alkaline material to obtain a melted plastic mixture; and a thermal decomposition device for heating the melted plastic mixture to thermally decompose the plastic, so as to produce a decomposition product and a decomposition residue.

Moreover, the pyrolytic decomposition apparatus according to the present invention comprises: a heater for heating the plastic to melt the plastic; a first thermal decomposition device for thermally decomposing the plastic in the presence of water and an alkaline material to produce a primary decomposition product and a decomposition residue; a first condenser for cooling the primary decomposition product at a first cooling temperature to separate the primary decomposition product into a first fraction containing a desired light constituent and a second fraction being heavy relative to the first fraction, by condensation of the second fraction; a second thermal decomposition device for thermally decomposing the second fraction of the primary decomposition product in an atmosphere pressurized at a predetermined pressure to produce a secondary decomposition product containing the desired light constituent in the form of gas; and a second condenser for cooling the first fraction and the secondary decomposition product at a second cooling temperature to condense a fraction containing the desired light constituent.

Moreover, the pyrolytic decomposition apparatus according to the present invention comprises a thermal decomposition device for thermally decomposing the plastic to produce a decomposition product and a recomposition residue, the thermal decomposition device comprising: an inner vessel for containing the plastic; an outer vessel enclosing the inner vessel; a heater for heating the inner vessel and thermally decomposing the plastic contained in the inner vessel to produce a decomposition product and decomposition residue; a communication portion for communicating the inside of the inner vessel with the space between the inner vessel and the outer vessel so that the decomposition product can be transferred from the inside of the inner vessel to said space between the inner vessel and the outer vessel; and a stirrer for stirring the plastic contained in the inner vessel.

Another pyrolytic decomposition apparatus according to the present invention comprises: a melting device for heating the plastic to melt the plastic; a plurality of thermal decomposition units for thermally decomposing the plastic, each of the thermal decomposition units comprising an inner vessel for containing the plastic, an outer vessel enclosing the inner vessel, a supply passage being connected to the inner vessel through the outer vessel for supplying the plastic into the inner vessel, a heater for heating the inner vessel and thermally decomposing the plastic contained in the inner vessel to produce a decomposition production and decomposition residue, a communication portion for communicating the inside of the inner vessel with the space between the inner vessel and the outer vessel so that the decomposition product can be discharged from the inside of the inner vessel to said space between the inner vessel and the outer vessel, an exhaust duct being connected to the inner vessel through the outer vessel for discharging the decomposition residue from the outer vessel, a residue container for receiving the discharged decomposition residue, and a stirrer for stirring the plastic contained in the inner vessel; a piping system connecting the melting device to each of the thermal decomposition units for supplying the melted plastic into each of the thermal decomposition units, a regulator for regulating supply of the plastic from the melting device to each of the thermal decomposition units so that the amount of the residue received in the residue container of each thermal decomposition unit may not exceed the capacity of the residue container; and a recovery device for recovering the decomposition product produced by each of the thermal decomposition units.

According to the present invention, the performance of the pyrolytic decomposition of the waste plastic can be improved, and the yield of the recovered oil can be remarkably increased, in comparison with that of the conventional method. Moreover, the recovery oil can be produced in a high quality. It is also possible to successively operate the pyrolytic decomposition apparatus, Aftertreatment of the pyrolytic decomposition apparatus is also quite easy.

BRIEF DESCRIPTION OF THE DRAWINGS

The features and advantages of the method and apparatus for pyrolytically decomposing plastic according to the present invention will be more clearly understood from the following description of the preferred embodiments of the present invention taken in conjunction with the accompanying drawings in which identical reference numerals designate the same or similar elements or sections throughout the figures thereof and in which:

FIG. 18 is a perspective view showing another exemplary configuration of a double-tube reactor for performing pyrolytical decomposition of plastic materials according to the present invention.

DETAILED DESCRIPTION OF THE PREFERRED EMBODIMENTS

Figure 1:
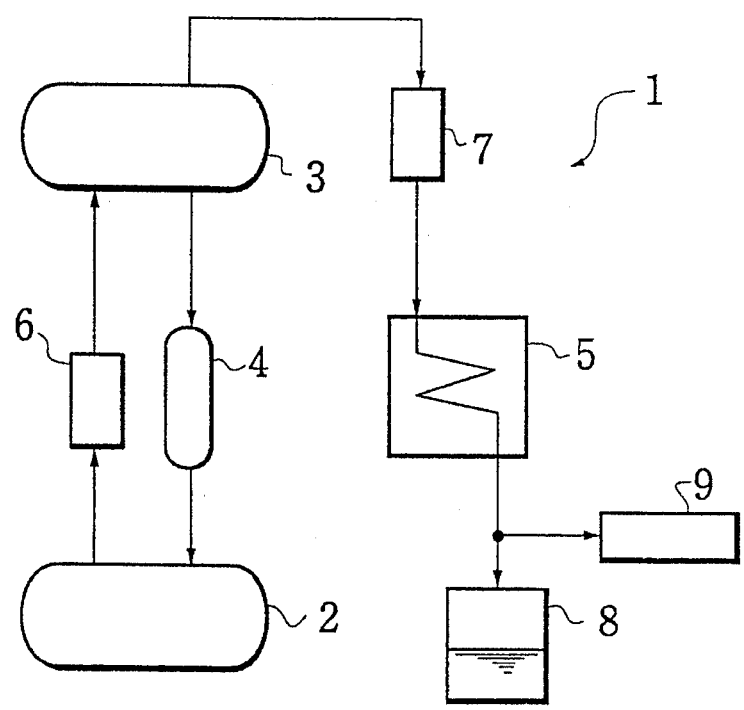
FIG. 1 is a block diagram of an exemplary configuration of an apparatus for performing the method of pyrolytically decomposing plastic materials according to the present invention.

First, the basic principle of the method of pyrolytically decomposing plastic materials according to the present invention will be outlined.

When plastics materials are pyrolytically decomposed at a temperature within a range of 300° C. to 600° C. under a normal pressure without an intentional supply of oxygen, various components in various molecular weights contained in a pyrolysis gas are concurrently produced. Therefore, when the pyrolysis gas is condensed to oil, the obtained oil does not have a very high quality, so that it is not suitable for the use as fuel material from a point of view of air pollution. In particular, in a case of the thermal decomposition of polyethylene, the condensate of the pyrolysis gas mixture often solidifies to make a wax at a room temperature as it contains a large amount of heavy constituents.

On the other hand, when the plastic materials are thermally decomposed in a closed reaction system, the pressure in the system increases spontaneously in reaction to the generation of the pyrolysis gas of the plastic materials. At the same time, the molecular motions are activated and the heat conductivity is increased in the reaction system. Moreover, since a boiling point of each constituent rises due to the pressure increase, the heavy or high-molecular-weight components easily remain in a liquid phase, and because of this, a decomposition performance can be improved in the above reaction condition. Thus the decomposition performance can be improved by increasing the pressure at the pyrolytically decomposing step. Here, however, an excessive pressure causes the high rate production of volatile components which are too light to condense at a room temperature, which in turn causes the decrease of recovery yield of the condensed oil. In light of this fact, a pressure within a range of 1 kg/cm$^2$ to 10 kg/cm$^2$ by gauge pressure is preferably applied to the reaction system.

However, as understood from the above, the effect of the pressure is only to shift a range of the molecular weight distribution of the constituents of the decomposition product toward the lower molecular weight side. Therefore, it is not possible to prevent the recovered oil from being contaminated by heavy substances by take above-described thermal decomposition method under increased pressure alone. In other words, a molecular weight distribution range in the recovered oil cannot be narrowed by the above-described thermal decomposition method under increased pressure alone. Accordingly, it is impossible to obtain the high quality oil.

On the other hand, it is possible to narrow the molecular weight distribution range of the components of the recovered oil by using a thermal decomposition method including the steps of: cooling the pyrolysis gas to condense a heavy fraction, such that the heavy fraction can be separated from a light fraction of the pyrolysis gas; and feeding the condensed heavy fraction back to the decomposition step. The employment of this method can certainly narrow the distribution range of the components constituting the recovered oil in comparison with that of the pyrolysis gas product. However, the pyrolysis gas product obtained by the thermal decomposition under a normal pressure contains large amounts of various heavy constituents, so that they cannot be removed satisfactorily by the above described cooling step. Moreover, an yield of the recovered oil is also reduced in this thermal decomposition method.

In view of the above-described facts, the present inventors carried out the research on methods of pyrolytically decomposing plastic materials, and it was found that when the step of performing the pyrolysis of plastic materials under increased pressure is combined with the step of fractionating the pyrolysis gas product to recover only a fraction of the desired light constituents, it becomes possible to improve the quality and the yield of the recovered oil drastically, and the oil recovered from the plastic materials scarcely contains the heavy components having a boiling point over 250° C.

Namely, the method and apparatus for pyrolytically decomposing plastic according to the present invention is characterized in that: the plastic is pyrolytically decomposed under increased pressure to obtain a pyrolysis gas product; and that the pyrolysis gas product is fractionated into a fraction of relatively heavy constituents and a fraction of relatively light constituents, of which the fraction of the heavy constituents being fed back to the decomposing step. The light constituents to be condensed and recovered as a oil material which are not condensed at the fractionating step are led to the recovering step. Here, the pyrolysis gas product obtained at the decomposing step is mainly composed of the relatively light substances, but it still contains a comparatively small amount of heavy constituents, so that at the fractionating step, the pyrolysis gas product is cooled down to a predetermined temperature in order to condense the relatively heavy constituents to be separated from the light constituents.

As described above, since the molecular weight distribution of the constituents of the pyrolysis product shifts to a lower range in accordance with the increase of the pressure in the decomposition reaction system, the pressure applied at the pyrolytically decomposing step of the present invention is set to a preset value appropriate for obtaining the oil having a desired quality. For example, when a rather light fuel like kerosine is intended to be obtained, it is preferable to apply a pressure within a range of 1 kgf/cm$^2$ to 6 kgf/cm$^2$ by gauge pressure to the pyrolytic decomposition system. When a pressure within the preferable range described above is applied, the oil product of the desired quality can be obtained at an yield of about 50 to 80% by weight. More preferably, the pressure to be applied to the pyrolytic decomposition system is selected from a range of 3 kg/cm$^2$ to 5 kg/cm$^2$. In a preferably pressured condition as described above, the waste plastic is heated to a temperature within a range of about 300° to 600° C.

The pyrolysis gas product obtained by the pyrolytic decomposition of the plastic is then led to the fractionating step. At this step, the pyrolysis gas is cooled to a predetermined temperature which is lower than that for the pyrolytic decomposition. As a result, relatively heavy constituents of the pyrolysis gas mixture are condensed and separated from relatively light constituents which remain in the gas form. The condensate of the heavy constituents is then fed back to the pyrolytic decomposition step, where they are further cracked. On the other hand, the relatively light constituents which pass through the fractionating step are further cooled down to a temperature in the vicinity of a normal temperature at the recovering step, such that they can be liquefied and recovered as the oil composed of relatively light constituents.

Here, the constituents of the fraction which can pass through the fractionating step can be changed in accordance with a level of the cooling temperature at the fractionating step. Accordingly, when it is desired to obtain the oil which is composed of a fraction distilled at 150° C. to 250° C., kerosene, the cooling temperature is preferably set within a range of 200° C. to 350° C., or more preferably, within a range of 250° C. to 300° C., while the preferable pressure as described above is applied. In a case the cooling temperature is lower than the above ranges, the contamination by the heavy constituents having a boiling point over 250° C. can be reduced. However, the excessive cooling reduces the amount of the oil product which can be recovered through a certain period. It is also possible to achieve the satisfactory separation by performing the fractionation of the pyrolysis gas product under a normal pressure. However, the cooling temperature in such a case should preferably be set to a level lower than that in the above case in order to clearly separate the cracked gas.

Now, the above-described method of pyrolytically decomposing waste plastic can be accomplished by using an apparatus having a construction as shown in FIG. 1.

According to the configuration of FIG. 1, an apparatus 1 for pyrolytically decomposing plastic comprises: a decomposition vessel 2 for pyrolytically decomposing plastic; a separation column 3 for fractionating the pyrolysis gas product into a heavy fraction of relatively heavy constituents and a light fraction of relatively light constituents; a pump 4 for feeding back the heavy fraction from the separation column 3 to the decomposition vessel 2; and a recovery device 5 in which the light fraction is condensed and recovered in the form of oil composed of the relatively light constituents by being cooled through a cooling tube provided inside the recovery device 5.

The separation column 3 is maintained at a temperature which is lower than that of the decomposition vessel 2. The decomposition vessel 2 and the separation column 3 are connected through a pressure control valve 6 which functions in such a manner that, when the gauge pressure inside the decomposition vessel 2 rises beyond a first preset value in response to the thermal decomposition of the plastic, the control valve 6 allows to release the gas from the decomposition vessel 2 to the separation column 3, and thereafter the gauge pressure inside of the decomposition vessel 2 is maintained at the first preset value. Moreover, the separation column 3 and the recovery device 5 are also connected through a pressure control valve 7 which functions so that, when The gauge pressure in the separation column 3 exceeds a second preset value, the pressure control valve 7 opens to release the gas from the separation column 3 to the recovery device 5 so as to maintain the pressure in the separation column 3 at the second preset level.

According to this configuration of FIG. 1, when the waste plastic articles broken into plastic pieces are heated in the decomposition vessel 2, the plastic pieces are thermally decomposed to generate the pyrolysis gas, such that the pressure in the decomposition vessel 2 is increased. Then the pressure reaches the first preset value, the pyrolysis gas is discharged into the separation column 3 so as to be cooled down to the temperature inside the separation column 3, such that the heavy constituents having high boiling points are condensed. The condensate of the heavy constituents is fed back to the decomposition vessel 2 by the pump 4, so as to be subjected to the thermal decomposition again. On the other hand, when the pressure inside the separation column 3 reaches the second preset value which is set by the pressure control valve 7, the light fraction composed of the light constituents which are not condensed at the separation column 3 is discharged into the recovery device 5. The light fraction is then sufficiently cooled down to a temperature in the vicinity of a normal temperature so as to be condensed into oil, which is collected in a vessel 8. Low-boiling constituents which cannot be liquefied in the recovery device 5 are led to a gas treatment equipment 9 for an appropriate after-treatment.

In the actual treatment of waste plastic articles, the waste plastic articles ordinarily include a great variety of plastic materials, and it is complicated to separate different waste articles in the mixture in accordance with kinds of the plastic materials. Therefore, it is highly desired to treat a mixture of the waste plastic articles without the separation or sorting of various plastic materials.

In this connection, it is noted that each kind of plastic polymer cleaves in a different manner. For example, the polymer molecules of polypropylene, polyethylene and the like cleave at random, while those of polystyrene and the like crack so as to make their original monomer, and those of polyvinyl chloride and the like cleave at their side branches. However, in any case, the product mainly contains unsaturated hydrocarbon compounds such as olefin compounds and aromatic compounds, so that when the mixture of a various plastic articles is subjected to the thermal decomposition treatment, the unsaturated hydrocarbon compounds as described above are produced. In contrast, a material suitable for oil fuel is to be mainly composed of paraffinic components and to contain a small amount of aromatic components such as kerosene and the like. Accordingly, it is desired to transfer the olefin components of the oil product obtained by the pyrolytic decomposition of the waste plastic to the corresponding paraffin components. For this purpose, it is preferable to utilize active alumina, zeolite and the like, because they can act as a catalyst for hydrogenation reaction of olefin double bonds.

Figure 2:
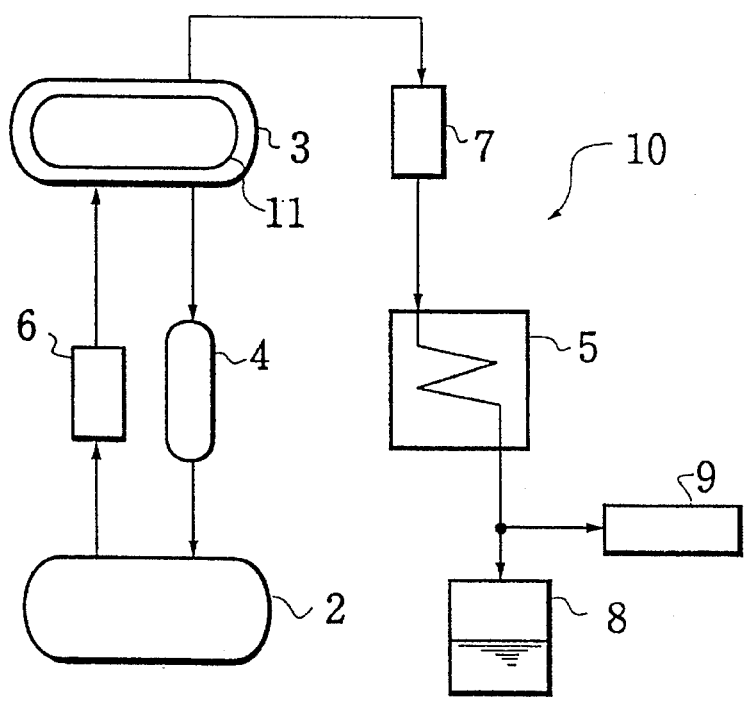
FIG. 2 is a block diagram of another exemplary configuration of the apparatus for performing the method of pyrolytically decomposing plastic materials according to the present invention.

Such a catalyst described above can be installed in the separation column 3 as a catalyst 11, as shown in the pyrolytically decomposing apparatus 10 of FIG. 2. Alternatively, instead of the separation column 3, an isothermal column which is charged with the catalyst may be connected with the control valves 6 and 7 and the pump 4 at the preferred temperature as described above. In this manner, the catalyst-charged isothermal column can work as both of the separation column 3 and the catalyst 10.

Now, the following points should be noted in the pyrolytic decomposition of plastic materials according to the present invention.

In a case the waste plastic material to be decomposed is composed of halogen-containing polymer such as polyvinyl chloride, polyvinylidene chloride and the like, the harmful and corrosive gas such as hydrogen chloride gas can be generated by the thermal decomposition, which can damage the pyrolytic decomposition apparatus, as well as contaminate the recovered oil. Moreover, polyvinyl chloride materials generally contain a plasticizer such as di(2-ethylhexyl) phthalate (DOP) and the like at a rate of about 30% by weight. This plasticizer DOP reacts by the application of heat and transferred into phthalic anhydride, as indicated by the following reaction formula (1).

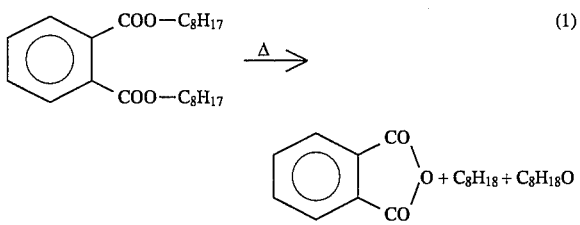

The phthalic anhydride easily sublimes, so that it sticks in the piping system of the pyrolytic decomposition apparatus to choke or stop the flow of gas product. To solve this problem, it was found to be effective to add an alkaline substance to the waste plastic during the thermal decomposition.

As an example of the alkaline substance to be added, hydroxylate compounds of alkaline metal and alkaline earth metal, e.g., sodium hydroxide, etc. can be used. The alkaline compound like these reacts with hydrogen chloride gas to produce salt and water vapour, as indicated in the following formula (2).

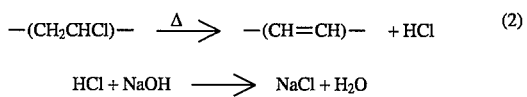

Consequently, most of the hydrogen chloride gas produced by the primary thermal decomposition, i.e., the decomposition at the side chains of the polyvinyl chloride component is transferred into metal chloride, which does not sublime and remains in the decomposition vessel 2. Therefore, the high quality oil product which scarcely contains chloride compounds can be obtained.

Moreover, in the presence of the alkaline compound, the plasticizer such as DOP contained in the PVC resin changes into phthalic acid metal salt in accordance with the alkaline saponification reaction, as indicated by the following reaction formula (3).

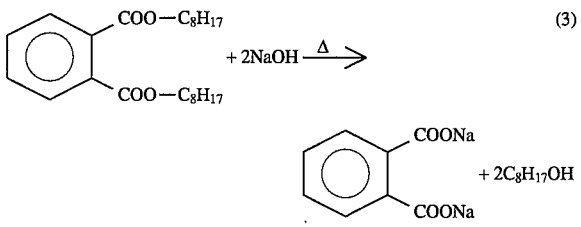

Therefore, neither the phthalic acid nor the phthalic anhydride is produced during the thermal decomposition, and consequently it becomes possible to prevent the piping system through which the pyrolysis gas product flows from being closed by those compounds. In a case a small amount of the phthalic acid or the phthalic anhydride is produced and attached to the piping system, the water vapour produced by the neutralization reaction of the alkaline compound and the hydrogen chloride gas can dissolve the sublimate phthalic compounds to flow them back into the decomposition vessel, so that the choking of the flow in the piping system can be prevented. Similarly, other ester compounds which are contained in the waste plastic as additives are hydrated, so that the waste plastic can be easily decomposed by heat, and it also becomes easy to carry out the decomposition of waste plastic difficult to decompose.

Furthermore, since the metal chloride salts can be dissolved in water, the decomposition residue (carbon) sticking to the salt in the decomposition vessel 2 can be easily removed by washing the decomposition vessel 2 with water after finishing the thermal decomposition operation. In addition, the alkaline agent which remains unreacted can also be washed off by water. Therefore, the post-operation cleaning of the apparatus can be easily accomplished.

The alkaline agent to be used in this thermal decomposition is not limited only to the above-described hydroxide compounds, and their metallic forms and metal oxide compounds may also be used. An amount of the added alkaline substance varies in accordance with an amount of the PVC resin included in the waste plastic to be treated. When an alkaline metal hydroxide compound is used, an amount within a range of about 0.2 to 2.0 parts by weight can be preferably utilized relative to the amount of PVC resin. When the amount of the alkaline agent is insufficient, hydrogen chloride gas can be generated, and this can cause the production of many chlorinated organic compounds. Additionally, the piping system of the pyrolysis apparatus is blocked by the sublimate decomposition products from the plasticzing agents. To the contrary, when an excessive amount of the alkaline compound is used, the operation of the apparatus consumes a huge amount of energy, and the corrosion of the decomposition vessel can be progressed. Moreover, the recovered oil product is contaminated by the metal component of the alkaline agent. The alkaline agent can be directly added to the plastic before the thermal decomposition treatment, although the manner of supplying the alkaline agent is not limited to this particular manner.

The above-described effects of the alkaline agent is enhanced by the addition of a small amount of water. Therefore, it is more preferable to perform the thermal decomposition in the presence of water in order to improve the quality of the oil product. The addition of water also remarkably strengthen the prevention of blockage of the piping system due to the sublimation. An amount of water necessary for achieving the above effects varies in accordance with a kind of the waste plastic to be treated, a temperature of thermal decomposition treatment, etc. In general, an amount of about 0.1 to 1 part by weight of water can be preferably used relative to one part by weight of plastic. If the water amount is insufficient, the decomposition will not be achieved effectively. On the contrary, if the water amount is excessive, the energy efficiency during the operation of thermal decomposition while decreased. For these purposes, it is desirable for the water to be used to have few impurities. The water can be directly added to the plastic before the thermal decomposition treatment, although the manner of supplying the water is not limited to this particular manner. For example, the water may be supplied as a water solvent for dissolving the above-illustrated alkaline material. Here, when the waste plastic to be treated contains water at an appropriate amount as described above, no additional water is necessary.

The water can become a hydrogen resource for improving the quality of the oil product, so that when the water is evaporated and dispersed away from the waste plastic during the thermal decomposition, it becomes impossible to achieve the sufficient act of the water on the plastic. However, as described above, when the atmosphere inside of the decomposition vessel is pressurized, the added water can efficiently achieve the functions as described above, because the density of the water vapour inside of the decomposition vessel is high. As a result, polymer chains of the plastic are easily scissioned, and an amount of light ingredients having a small molecular weight in the recovered oil product increases. In other words, the high quality oil product such as gasoline can be obtained.

In addition to the above, it was also found that the alkaline agent described above also makes a catalytic effect to improve a decomposition performance in both cases of decomposing PVC resin and other non-PVC plastic materials. This catalytic effect works both in a case of decomposing in a pressurized atmosphere, but as well as in a case of decomposing in an atmosphere of a normal pressure. Therefore, by heating the waste plastic with water and the alkaline material such as sodium hydroxide and the like under increased pressure, a recovery yield of the oil product can be remarkably increased both in the case of decomposing PVC resin as well as in the case of decomposing other various kinds of plastic. At the same time, the quality of the recovered oil can be improved as the recovered oil is entirely composed of light ingredients of a small molecular weight.

As for an appropriate amount of the alkaline agent to be added in order for the catalytic effect to work, in a case of using sodium hydroxide, it is preferable to add an amount greater Than or equal to about 5% by weight relative to the amount of the plastic, if the amount is less than 5% by weight, the decomposition performance is deteriorated. The alkaline agent can be added directly to the plastic before the thermal decomposition treatment, although the manner of supplying the alkaline agent is not limited to this particular manner. For this catalytic effect to work, it is also preferable for the thermal decomposition treatment to be performed in the presence of water, and the appropriate amount of the water is greater than or equal to 10% by weight relative to the amount of plastic. If the amount of the water is less than 10% by weight, a ratio of heavy ingredients in the recovered oil product increases. It is also preferable to, use the water which contains few impurities. The water can be adding directly to the plastic before the thermal decomposition treatment, although the manner of supplying the water is not limited to this particular manner. The atmosphere inside the decomposition vessel is preferably pressured at a gauge pressure greater than or equal to 1 atm ($\approx 1.03$ kgf/cm$^2$).

In actually performing the method of pyrolytically decomposing plastic materials according to the present invention, the apparatus is required to withstand the above-described hard conditions, concerning a high temperature, a highly pressurized atmosphere, and a corrosion damage due to a highly concentrated alkali. In this regard, it was found that a corrosion-resistant alloy containing nickel and chromium is suitable as a material for the decomposition vessel 2. More specifically, an iron alloy containing nickel component at a rate greater than or equal to 5% by weight and chromium component at a rate greater than or equal to 10% by weight was found to be preferable. For example, a stainless steel SUS F 304 in accordance with Japanese industrial Standard No. G3214 is suitable for the decomposition vessel 2. If a rate of the nickel component is low, the corrosion resistance of the alloy deteriorates, so that it is difficult to withstand the corrosion damage due to the highly concentrated alkaline agent at a high temperature under increased pressure. If a rate of the chromium component is low, the mechanical properties of the alloy deteriorate at a high temperature, so that it is not suitable for the to use under increased pressure.

As described above, the iron alloy containing nickel and chromium is excellent in the corrosion resistance as well as in the mechanical strength at a high temperature, so that this alloy is suitable as material of an apparatus for practicing the method of pyrolytically decomposing waste plastic according to the present invention. In addition, it should be noted that the nickel, and chromium components in the above-mentioned iron alloy are capable of functioning catalytically in the decomposition reaction of the waste plastic under increased pressure.

In addition to thermoplastic compounds such as polyethylene, polystyrene, polypropylene and the like, the waste plastic articles to be decomposed can be expected to include articles made of thermoset compounds, e.g., sealing plastic for semiconductor devices. In this regard, it was found that, in pyrolytically decomposing a mixture of various waste plastic articles without sorting different kinds of materials involved, an yield of the oil recovered from plastic articles of polystyrene, polyethylene and the like can be improved when these plastic articles are treated in the presence of the sealing plastic for semiconductor devices.

The sealing plastic for semiconductor devices ordinarily contains silicon dioxide (silica) which is introduced by a raw material such as fused quart glass powder, crystalline silica powder and the like. These silica materials generally have a high in heat conductivity, so that the silica material in the thermoset sealing plastic makes up for the low heat conductivity of the thermoplastic materials, and improves the heat conductivity of the overall plastic mixture. As a result of this, the temperature of the plastic mixture inside the decomposition vessel can be raised uniformly and rapidly. Therefore, it is not at all necessary to separate the waste plastic mixture into groups of thermoplastic materials and thermoset materials before thermal decomposition treatment, and in fact, it is more preferable to heat the waste plastic mixture as it is, in order to increase the yield of the recovered oil. In a case the sealing resin for semiconductor devices which contains silicon dioxide at a rate of about 70% by weight is introduced into the reaction system, when 10 to 20% by weight of the sealing resin relative to the amount of the other waste plastic is mixed, the obtained oil can be recovered with 8 to 10% increase in the recovery yield.

As another method for improving the heat conductivity, a heat transfer medium in a form of molten salt, inert oil such as silicone oil and the like, can be mixed with the waste plastic material. Such a heat transfer medium is in a liquid state at the decomposition temperature of the treated plastic, and functions to increase a heat transfer efficiency, so that it becomes possible to quickly raise the temperature of the plastic. At the same time, the treated plastic can be uniformly heated due to fluidity of the heat transfer medium, such that the generation of hot spots can be prevented and the improved safety during the operation can be achieved.

Moreover, the heat transfer medium can work to prevent the tar produced by the decomposition reaction from adhering to the decomposition vessel 2.

Furthermore, the heat transfer medium can also work to shield the treated plastic from oxygen gas. Namely, the oxygen gas partially oxidizes plastic, ordinarily, so that it can be used as a decomposition reaction initiator. However, the oxygen gas also badly affects the properties of the recovered oil. Especially in a case the oxygen gas has the concentration of over 15% by volume, the recovered fuel oil has a high viscosity and contains a large amount of tar ingredients, so that the yield of the recovered oil is also low. Therefore, the oxygen must not be supplied during the thermal decomposition treatment. For this purpose, if the heat transfer medium as described above is employed, the waste plastic is covered by the fluid medium, such that it can be shielded from the oxygen during the thermal decomposition treatment.

As the heat transfer medium described above, an inert oil having a boiling point higher than or equal to 400° C., a molten salt having a melting point lower than, or equal to 200° C. and the like can be utilized preferably. As a typical example, a silicone oil and inorganic molten salts such as ternary nitrate, e.g., $NaNO_3$—$KNO_3$—$NANO_2$, can be used. However, the heat transfer medium is not limited to these preferable examples, and any other medium that is in a liquid state during the thermal decomposition treatment and does not make an undesirable reaction with the plastic can be utilized.

In the present invention, it is also effective to add a catalyst to the waste plastic in order to accelerate the decomposition reaction. One or more catalyst is preferably selected from nickel oxide, ferric oxide, cobalt oxide, copper oxide, manganese dioxide, silica, zirconium oxide (zirconia) and titanium dioxide (titania) in accordance with a kind and a property of the plastic to be treated. By addition of the catalyst, an amount of ingredients of a low molecular weight in the recovered oil increases, and the molecular weight spread of the produced ingredients is narrowed, so that the quality of the obtained oil product can be improved. The catalyst is preferably used at an amount within a range of 10 to 200% by weight relative to the amount of the plastic to be treated.

Even in a case the catalyst for accelerating the decomposition reaction is employed for the thermal decomposition, the addition of the water is also effective in improving the quality of the recovered oil. A preferred amount of the water to be added varies in accordance with a kind of the plastic to be treated and a temperature of the thermal decomposition treatment. However, generally speaking, it is preferable to use the water within a range of 0.1 part to 2 parts by weight relative to an amount of the plastic to be treated. If the amount of water is insufficient, the decomposition performance is deteriorated. At the same time, the range of molecular weight distribution of the oil ingredients spreads, and the production of olefin ingredients is promoted, such that the properties of the oil product can be deteriorated. On the contrary, if an excessive amount of water is added, an undesirably huge amount of energy is required to operate the apparatus. It is also preferable to use the water which contains few impurities. The water can be added directly to the plastic before the thermal decomposition treatment, although the manner of supplying the water is not limited to this particular manner.

Each of the heat transfer medium, decomposition reaction catalyst and water described above separately achieves the respective effect as described above, and the combined use of these can enhance the achieved effects further.

As described above, recovery efficiency in pyrolytic decomposition of plastic materials can be improved by addition of water, alkaline agent, etc. Here, it is of course desired that those additives are present in the plastic material to be decomposed as uniformly as possible. To mix the additives and the plastic material uniformly as a whole can be realized at a certain degree by breaking the plastic material and the additive into fine particles before mixing them. However, as a more advantageous method, it is recommended, instead of the mixing step described above, to perform melting/kneading pretreatment prior to the main pyrolytic decomposition step. In the melting/kneading pretreatment, the waste plastic material is melted by heat and kneaded with the additive. By the melting pretreatment, a non-uniform mixture of different kinds of waste plastic can be transformed into a mass of uniform plastic composite. Therefore, this pretreatment is also preferable for the case in which the main pyrolytic decomposition is performed without additives, specifically, an alkaline material.

According to the melting/kneading method, the plastic material is heated, made soft, and then kneaded with the additives. In view of economic energy consumption in the whole of the pyrolytic decomposition process, is preferred to introduce the molten and kneaded plastic material directly to both the pyrolytically decomposing step and the recovering step, without cooling of the molten plastic material. The heating temperature in the melting/kneading pretreatment is appropriately set to a temperature in accordance with the kind and content of the plastic contained in the waste plastic material such that pyrolytic decomposition of the plastic material to be treated is inhibited. Such a temperature is, in general, within a range of 100° to 300° C., and preferably, 150° to 250° C. At a temperature in the vicinity of 300° C. or more, elimination of HCl from the PVC resin begins and it is then required to provide some means for removing the eliminated HCl gas from the reaction system, or trapping the HCl gas so as not to react with the plasticizing agent. For example, if the waste plastic material is mixed with an alkaline material during the melting/kneading pretreatment, the eliminated HCl gas is trapped by the alkaline material.

For performing the melting operation, ordinary kneaders, extruders with a screw and the like are applicable. Here, it should be noted that, if small bubbles are introduced into the molten plastic material, namely, if the plastic material is foamed at the melting/kneading pretreatment step, elimination reaction of HCl from the PVC resin at the pyrolytic decomposition reaction is enhanced. In particular, if both bubbles and water are introduced to the plastic material to be decomposed, the effect is remarkable.

The plastic material can be foamed by using various manners. For example, the molten plastic material can be formed into a foam by stirring and mixing with air or gas by using mechanical force. Alternatively, the plastic material is melted and kneaded in the presence of a foaming agent. At the foaming step, either closed-cell foamed plastic or open-cell foamed plastic can be obtained by controlling the conditions in which the plastic material is foamed. For the present invention, it is preferred to regulate the melting/kneading pretreatment step to form an open-cell foam plastic material in accordance with the known practical manners. In ordinary foam materials such as thermal insulation materials, acoustic insulating materials, cushioning materials and the like, forming extent of 1 to 80 times expansion is employed, and any extent of foaming containing the above range is applicable for the present invention. In regard to the dimensions of the bubbles, small bubbles are suitable for the present invention, and a cell diameter of approximately 200 to 500 μm is preferred.

In order to obtain a foamed plastic material which can be easily handled, nontoxicity, odorlessness, non-combustibility, non-corrosiveness, low molecular weight, thermal and chemical stability, and low diffusivity such that the diffusion to the plastic membrane is lower than that of air are required to the gas which is produced by the foaming agent or mechanically introduced into the molten plastic material. For an example of the gas satisfying the above requirements, nitrogen gas, carbon dioxide gas and the like can be given.

The foaming agents can be classified into three general types, solvents, decomposable organic compounds, and inorganic compounds.

The solvent type foaming agents include a solvent which can evaporate rapidly, such as heptane, toluene and the like, and the decomposable organic compound type foaming agents include, for example, N-nitroso compounds, sulfonylhydrazide compounds and the like. The inorganic compound type agents include sodium bicarbonate, ammonium carbonate, ammonium nitrite, azide compounds, sodium borohydride, light metals and the like.

Specific example of the azide compounds described above includes, for example, azobisformamlde, azobisisobutyronitrile and the like. As for the N-nitroso compounds, N,N'-dimethyl-N,N'-dinitrosoterephtalamide, N,N'-dinitrosopentamethylenetetramine and the like are given by way of example, The sulfonylhydrazide compounds includes, for example, p-toluensulfonyl hydrazide, p,p'-oxybis(benzene sulfonyl hydrazide) and the like, and the azide compounds includes sodium azide ($NaN_3$) and the like. In regard to the light metals, magnesium, aluminum and the like can be given by way of example.

Figure 3:
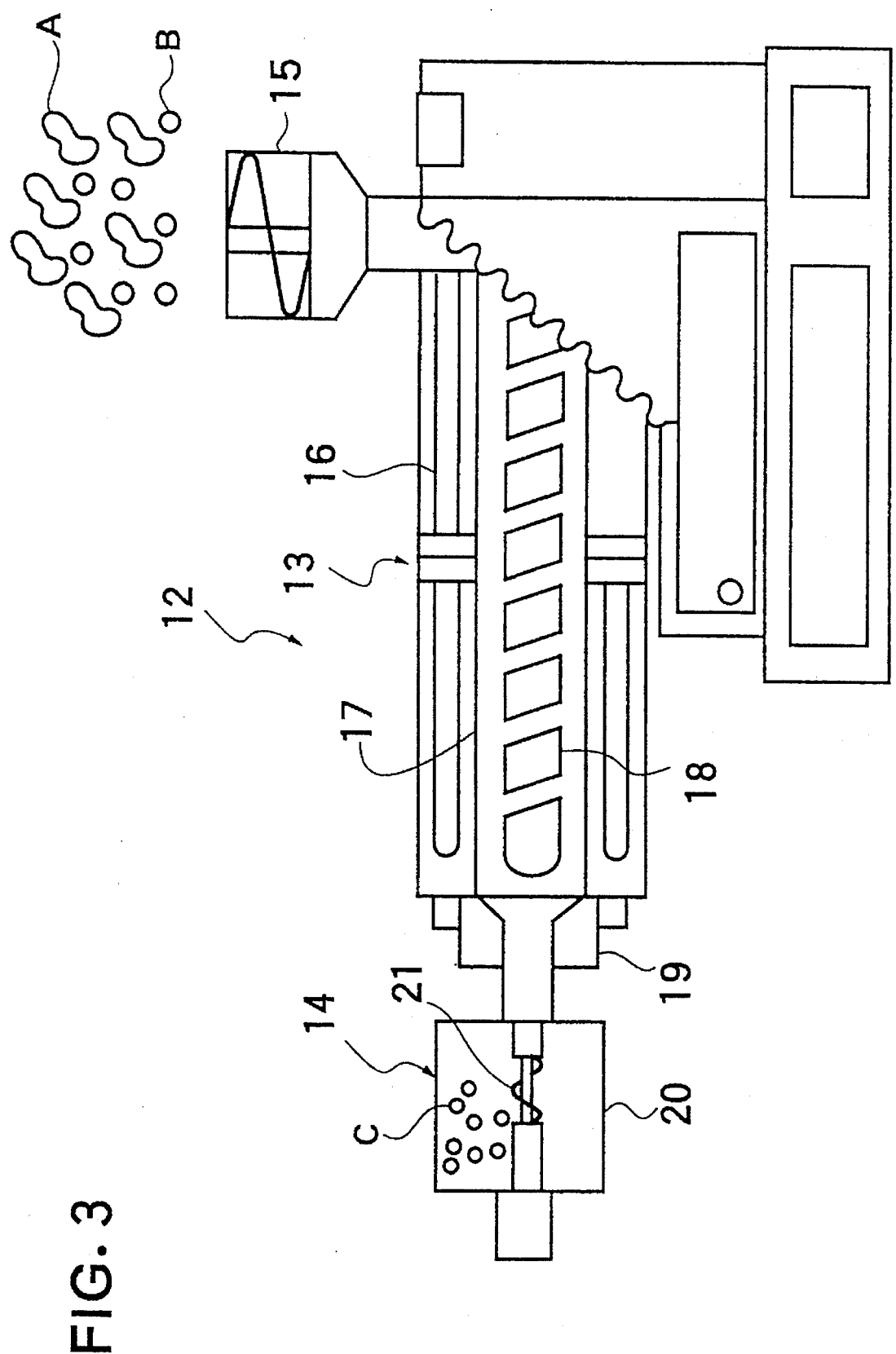
FIG. 3 is a sectional schematic illustration of an extruder employed for the method of pyrolytically decomposing plastic materials according to the present invention.

The melting/kneading operation with or without foaming can be practiced by using an extruder, for example, that as shown in FIG. 3.

The extruder 12 of FIG. 3 comprises an elongated main unit 13 and a cooling unit 14.

On the upper portion of one end of the main unit 13 of the extruder 12 provided is a hopper/mixer unit 15. The waste plastic mixture A and the additive (foaming agent, water, alkaline material, etc.) B are ground and mixed by a mixer incorporated into the hopper/mixer unit 15, and the ground plastic mixture A and additive B are then introduced into the main unit 13. A heater 16 and a screw unit 17 are provided inside the main unit 13 of the extruder 12 so that the heater 16 surrounds the screw unit 17. By rotation of a screw 18 of the screw unit 17, the ground plastic mixture A and the additive B are transported, while they are heated and softened. During transportation with the screw, the softened plastic mixture A is kneaded. If a foaming agent has been introduced into the plastic mixture A in advance, the foaming agent generates bubbles at this time. The foamed plastic material is soft and like marshmallow. A die 19 is fitted to the main unit 13 for molding the kneaded and transported plastic material into a plastic mass having a predetermined cross-sectional dimension. A water vessel 20 of the cooling unit 14 is connected to the die 19 for quickly cooling and making hard the plastic material molded and discharged from the die 19. Moreover, a cutting knife 21 for cutting the cooled plastic material is provided in the vicinity of the die 19 so as to form plastic pellets C having a predetermined dimension. By use of the die 19 which regulates the thickness of the kneaded plastic mass, it becomes possible to cool the kneaded plastic mass regularly, which results in easy and accurate cutting by the cutting knife 21, of the plastic material cooled in the water vessel 20.

Operation of melting/kneading pretreatment is carried out as follows.

First, the waste plastic mixture A and the additive (foaming agent, water, alkaline material, etc.) B are placed into a hopper/mixer portion 15 at which they are ground and mixed. The mixture of the plastic and the additive ground is transported to the main unit 13 of the extruder 12 and heated by the heater 11. The mixture of the heated and molten plastic and the additive is pushed forward by the screw 18 and molded by the die 19. Then, the molded plastic is rapidly cooled in the water vessel 20. The waste plastic material after rapid cooling is cut with the cutting knife 21 into small pellets C, which are used as a raw material for recovering fuel production.

As clearly understood from the former description of the pyrolytic decomposition method with referring to FIGS. 1 and 2, separation of the heavy constituents of the decomposition product from the light constituents is greatly effective for obtaining fuel product of high quality by pyrolytic decomposition of the plastic material. In the first proposed pyrolytic decomposition method of the present invention, the atmosphere in which pyrolytic decomposition is performed is pressurized at a constant level. However, this feature can be also modified so that the pyrolytic decomposition process includes a few separate steps at each of which the pressure within the pyrolytic decomposition vessel is set to a level different from each other. In other words, the pyrolytic decomposition may be carried out through a plurality of separate decomposition steps. For example, the waste plastic material is pyrolytically decomposed first at a low pressure to obtain a primary decomposition product in a gaseous state, which contains a large amount of heavy constituents. The primary product is then separated into a light fraction and a heavy fraction by the condensation device as used in the embodiments of pyrolytic decomposition method described above. The heavy fraction is then introduced into a high pressure decomposition step and thermally decomposed again, thereby the secondary product mainly composed of a light fuel is recovered. In this modification, the light fraction which is separated from the primary pyrolytic product obtained by the low pressure step may be recovered together with the secondary product which is obtained by the high pressure step. This modification can be effectively employed, in particular, for pyrolytically decomposing waste plastic containing PVC materials. The details will be described below.

When PVC resin is thermally decomposed in an atmosphere which contains no oxygen, bonds of the side branch contained in the PVC are broken prior to those of the main chain, so that hydrogen chloride was is generated. Moreover, the PVC resin contains a large amount of plasticizer agent (DOP, etc.) which changes into a decomposed compound, i.e. phthalic anhydride, etc., during the pyrolytic decomposition reaction. This compound reacts with the hydrogen chloride gas to produce a harmful organic chlorine compound. The phthalic anhydride itself also sticks in the piping system of the pyrolytic decomposition apparatus to choke or stop the flow of gas product. At the same time, for polyolefinic resins such as polyethylene and the like, degradation is caused by random scission of the main chain thereof, so that fuel product containing various constituents of gasoline to heavy oil is obtained.

In contrast with the above, if pyrolytic decomposition of the plastic material containing PVC resin is performed at a reduced pressure, the plasticizer agent contained in the PVC resin is easily vaporized to leave the reaction system, before it reacts and changes into the anhydride form. Therefore, production of the organic chlorine compound can be prevented by reducing the pressure at which the pyrolytic decomposition is carried out. On the other hand, the decomposition product of the polyolefinic resins at a reduced pressure contains rather heavy hydrocarbon constituents.

However, these heavy constituents are vaporized to leave the decomposition system, because the atmospheric pressure is low. After the above-described pyrolysis at a reduced pressure, if the heavy constituents are collected and thermally decomposed again at an increased pressure, decomposition and lightening of heavy constituents are further proceeded, because a more pressurized atmosphere gives rise to a rise in boiling temperature as well as a shift of vapor-liquid equilibrium position. The distribution of constituents of the decomposition gas obtained by the double-step decomposition becomes remarkably narrower than that by the single-step decomposition. Therefore, the product obtained by the above-described modified method can be easily utilized as a fuel. In the double-step decomposition process described above, it is also easier to control the final fuel product so as to contain the desired light constituents in comparison with the single-step decomposition process, because, in the double-step decomposition process, the reaction conditions can be regarded as being once changed in accordance with the object to be decomposed, from those for the raw plastic to chose for the heavy constituents of the primary decomposition product In the above-described double-step decomposition process, since the primary product in a gaseous state after the first decomposition at the reduced pressure contains hydrogen-chloride gas, it is preferred to clean the primary gaseous product with alkaline material. For example, if the primary gaseous product is washed by means of a shower of an aqueous alkali liquid on the primary gaseous product, the hydrogen chloride gas is collected into the alkali liquid in the form of harmless salt, and the heavy constituents of the washed gaseous product are condensed to an oil and supplied to the subsequent step of decomposition at the increased pressure. As a result, the secondary gaseous product obtained from the second decomposition step contains no hydrogen chloride. Therefore, the secondary gaseous product can be introduced into a column of catalyst for the purpose of reforming the secondary gaseous product. The plasticizer agent (DOP, etc.) is decomposed and saponificated by the alkaline material during the cleaning of the secondary gaseous product as well.

As described formerly, if the pyrolytic decomposition is performed in the presence of an alkaline material, and preferably with water (either liquid or vapour water), the decomposed gas product contains hardly any organic chlorine compound, because hydrogen chloride is neutralized by the alkaline material, and the plasticizer agent is also saponificated by the alkaline material. In accordance with this, contamination of the final product by hydrogen chloride and organic chlorine compound can be prevented by performing the first decomposition step of the double-step decomposition method in the presence of an alkaline material, instead of the alkali washing treatment.

In connection with the above, if the plastic material is subjected to the melting/kneading pretreatment with the alkaline material at a temperature of 200° to 400° C. prior to the pyrolytic decomposition, the chlorine is trapped by the alkaline material in the plastic material, as described above. Therefore, it is possible to prevent production of the organic chlorine compound during the double-step pyrolytic decomposition process. Moreover, it is possible to reduce the amount of the alkaline material which is added for the first decomposition. In addition, since the plastic material is introduced into the first decomposition step in the molten condition, the pyrolytic efficiency is distinctly raised. For the melting/kneading protreatment, it is possible to use the main unit 13, that is, the extruder 12 without the cooling unit 14.

An apparatus for practicing the above-described double-step decomposition process can be efficiently operated by constructing the apparatus to comprise transportation means for enforcingly transporting the gaseous decomposition product from a low-pressure decomposition vessel to an alkali treatment vessel by means of kinetic energy of the decomposition gas which is produced in a high-pressure decomposition vessel. For the transportation means, it is possible to use, for example, combination of a turbo-fan which is provided on the outlet of the high-pressure decomposition vessel and a blower fan which is cooperatively connected to the turbo-fan. In this combination, the turbo-fan is rotated by the kinetic energy of the gas produced in the high-pressure decomposition vessel in accordance with the turbo principle. Then, the rotational power is transmitted to the blower fan which is connected to the turbo-fan. As a result, the decomposition gas product in the low-pressure decomposition vessel is forcedly blown into the alkali treatment vessel, and the inside pressure of the low-pressure decomposition is continuously reduced.

Now, referring to the drawings, specific examples of the above-described apparatus for the double-step decomposition process are described below.

Figure 4:
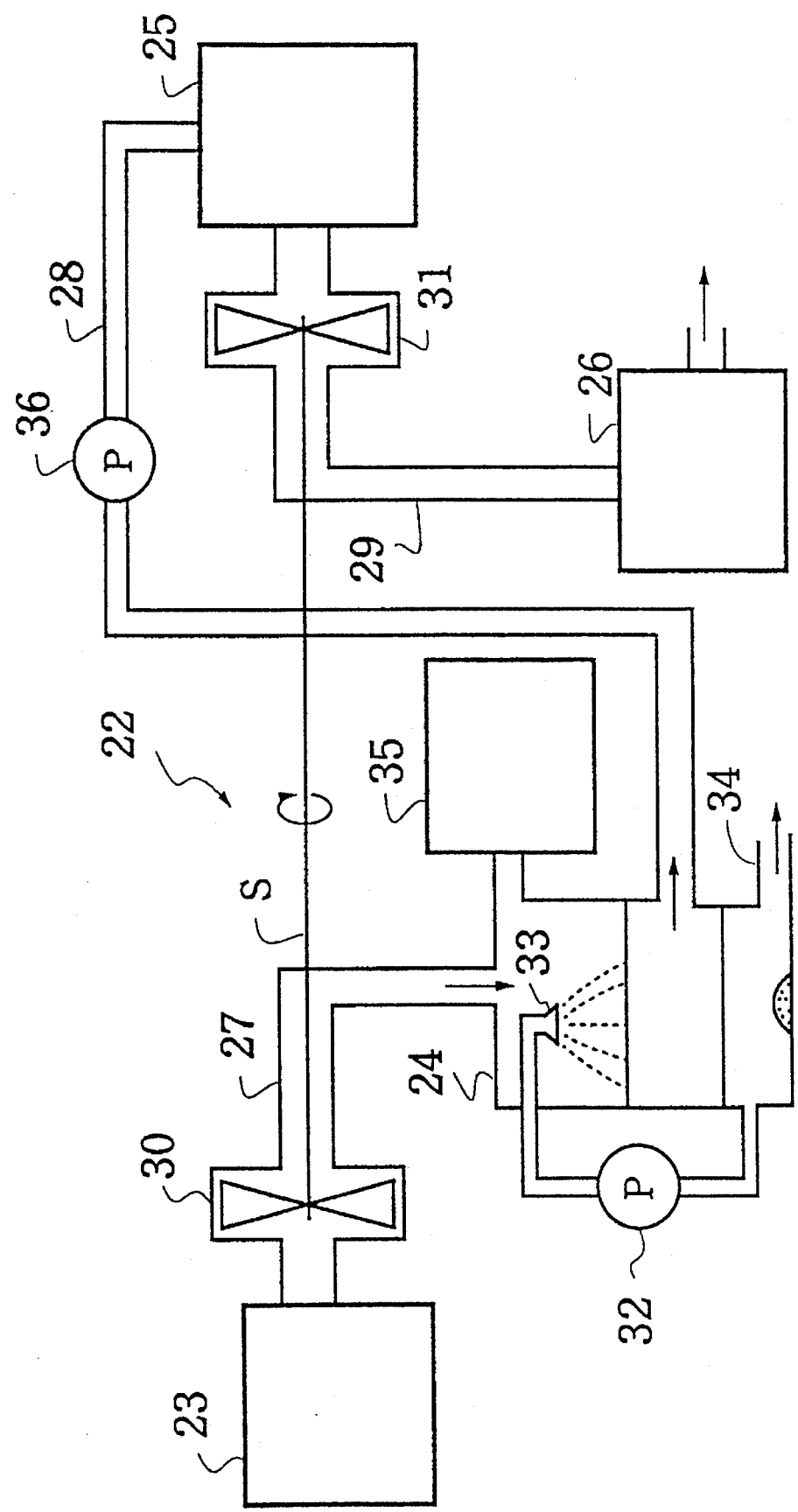
FIG. 4 is a schematic illustration of the third exemplary configuration of the apparatus for performing the method of pyrolytically decomposing plastic materials according to the present invention.

FIG. 4 is a schematic illustration of an embodiment of the pyrolytic decomposition apparatus for the double-step decomposition process according to the present invention.

In FIG. 4, the pyrolytic decomposition apparatus 22 comprises a vacuum decomposition vessel 23, an alkali cleaning vessel 24, a pressurized decomposition vessel 25 and a condenser 26. The vacuum decomposition vessel 23 is communicated to the alkali cleaning vessel 24 through a conduit 27, and the alkali cleaning vessel 24 is connected to the pressurized decomposition vessel 25 with a conduit 28. Moreover, the pressurized decomposition vessel 25 and the condenser 26 are connected by a conduit 29. On the conduit 27 for introducing the decomposition gas containing the heavy constituents from the vacuum decomposition vessel 23 to the alkali cleaning vessel 24 provided is a blower fan 30. On the other hand, a turbo-fan 31 is provided on the conduit 29 for discharging the decomposition gas from the pressurized decomposition vessel 25. The blower fan 80 is connected to the turbo-fan 31 so that the axis S of the blower fan 30 is coaxial with that of the turbo-fan 31. Alternatively, the blower fan 30 may be cooperatively linked to the turbo-fan 31. Moreover, an aqueous alkali solution is placed into the alkali cleaning vessel 24 and circulated by a pump 32 through a pipe which connects the bottom portion of the cleaning vessel 24 and a nozzle 33 disposed inside the alkali cleaning vessel 24. The aqueous alkali solution supplied to the nozzle 33 is showered on the decomposition gas which is supplied from the vacuum decomposition vessel 23 to the alkali cleaning vessel 24, The neutral salt precipitated on the bottom of the alkali cleaning vessel 24 is appropriately discharged through an outlet 34 which is connected to the bottom portion of the alkali cleaning vessel 24. To the upper portion of the alkali cleaning vessel 24 connected is an exhaust gas treatment device 35.

In the pyrolytic decomposition operation with the above decomposition apparatus, a mixture of broken pieces of various waste plastics including PVC resin and polyolefinic resin is placed into the vacuum decomposition vessel 23 and heated. When the temperature is raised, hydrogen chloride, vapour of the plasticizer agent contained in the PVC resin and decomposition gas containing heavy constituents which is produced from the polyolefinic resin are generated. The mixed gas of them is introduced into the alkali cleaning vessel 24 via the blower fan 30 The hydrogen chloride is removed from the mixed gas in the form of harmless salt by a shower of the aqueous alkali solution. The remaining mixed gas is mostly liquefied into an oil.

The liquefied oil is introduced into the pressurized decomposition vessel 25 through the pump 36 and further decomposed to a light product gas. This light product gas flows into the condenser 26, while the flow of the product gas rotates the turbo-fan 31. The product gas in the condenser 26 is condensed and recovered as a light oil.

When operation conditions of the apparatus 22 are set as follows, the recovered oil product mainly contains aliphatic and aromatic hydrocarbons having 4 to 18 carbons and has no detected organic chlorine compound, according to gaschlomatographic analysis of the recovered oil product.

inside atmosphere of the vacuum decomposition vessel 23: −1 to 0 kg/cm² by gauge pressure inside atmosphere of the pressurized decomposition vessel 25: 3 to 5 kg/cm² by gauge pressure temperatures at the vacuum decomposition vessel 23 and the pressurized decomposition vessel 25: 350° to 600° C. temperature at the condenser 26: 250° to 300° C.

In contrast, if the apparatus 22 is operated, with the turbo-fan 36 and the blower fan 30 removed, the recovered oil product mainly contains hydrocarbons having 4 to 32 carbons, but the organic chlorine compound is not detected.

In light of the above, it is understood that, if the pressure at the primary decomposition step becomes higher than the normal pressure, the content of the organic chlorine compound in the recovered oil product increases. Moreover, if the pressure at the secondary decomposition step becomes lower, decomposition reaction becomes insufficient to leave heavy oil ingredients.

Another embodiment of the pyrolytic decomposition apparatus for double-step decomposition method will be described below, with referring to FIG. 5 which is a schematic illustration of the decomposition apparatus.

The decomposition apparatus 37 comprises an extruder 38, a first reaction furnace 39, an additive container 40, a first condenser 41, a vapor-liquid separator 42, a second reaction furnace 48 and a second condenser 44. In order pressurize the second reaction furnace 39 at a predetermined pressure, a pressure pump 45 and a check valve 46 are connected between the first condenser 41 and the second reaction furnace 39, and a pressure control valve 47 is provided between the second reaction furnace 39 and the second condenser 44.

In the above decomposition apparatus 37, the alkali cleaning vessel for cleaning the primary decomposition gas to remove the hydrogen chloride, which is provided on the first embodiment of the apparatus for the double-step decomposition, and the waste plastic material containing PVC resin is thermally decomposed in the presence of alkali.

In operation of the above decomposition apparatus 37, the waste plastic material is first melted and kneaded by heating at a temperature lower than 300° C. The molten plastic after the melting/kneading step is transferred to the first reaction furnace 39. Then, alkaline material and water which are contained in the additive container 40 are supplied to the molten plastic at the top portion of the first decomposition furnace 39, and the plastic material is heated and decomposed at a temperature of about 350° to 600° C. in the presence of water and alkaline material. The pyrolytic decomposition gas flows into the first condenser 41. In the first condenser 41, the pyrolytic decomposition gas is cooled at a temperature of 250° to 300° C., and a portion of the decomposition gas, being composed of relatively heavy constituents, is liquefied to separate from the decomposition gas. The other portion of the decomposition gas is not liquefied by the first condenser 41 and transferred to the second condenser 44.

The liquefied portion is supplied to the second reaction furnace 43 through the check valve 46 by the pressure pump 45. In the second reaction furnace 43, the liquefied portion is again subjected to pyrolytic decomposition, namely, thermally decomposed at a temperature of about 350° to 600° C. in an atmosphere pressurized at a gauge pressure of 1 to 10 kgf/cm². The secondary decomposition gas is transferred to the second condenser 44 through the pressure control valve 47 and is cooled to a room temperature, together with the gas portion which is not liquefied in the first condenser 41, thereby a condensed fuel product is obtained. The obtained fuel product is received in a recovery container 48, and the remaining gas portion which is not condensed in the second condenser 44 is cleaned with an alkaline material in an exhaust gas treatment unit 49 and then burned with a burner for aftertreatment. The afterburned gas is discharged from the apparatus In operation of the decomposition apparatus 37, the melting/kneading pretreatment which is described before is performed in addition to the basic operation of the double-step decomposition method. For the extruder 38 used for the melting/kneading pretreatment, either of a common extruder or the main unit 13 of the extruder 12 described in FIG. 3 may be utilized. The melting/kneading pretreatment is effective for improving the pyrolytic decomposition efficiency. However, in case that it gives rise to generation of hydrogen chloride gas from PVC resin, the primary decomposition gas in the first reaction furnace 39 is possibly contaminated by the hydrogen chloride gas produced in the extruder 38. In that case, it is desired to provide an alkali cleaning device such as an alkali liquid spray for cleaning the primary decomposition gas inside the first reaction furnace 39, or to add an alkaline material to the waste plastic to be melted and kneaded for trapping the hydrogen chloride gas. Alternatively, a forced-air draft means may be provided on the extruder for removing the produced hydrogen chloride gas from the kneaded plastic material.

After the pyrolytic decomposition of waste plastic materials, black-colored residual product remains in the pyrolytic decomposition vessel and adheres to the inner surface of the vessel. Of the residual products of the various plastic materials, those of polyolefinic material such as polyethylene, polypropylene and the like make soft lumps such that can be easily scraped away from the decomposition vessel and are broken into fine powder like carbon black powder. In contrast, the residual product of PVC resin makes a hard mass like coking coal so that it is quite difficult to satisfactorily remove the residual product la a short period by scraping or the like. Therefore, if a plastic material to be pyrolytically decomposed contains PVC resin, operation efficiency in repeated use of the decomposition apparatus remarkably deteriorates. Moreover, the worker's health may be easily lost by engaging the worker for a long time on scraping the residual product away.

The above-described problems can be solved by modifying the decomposition vessel of the pyrolytic decomposition apparatus to have a double-pot structure.

Figure 6:
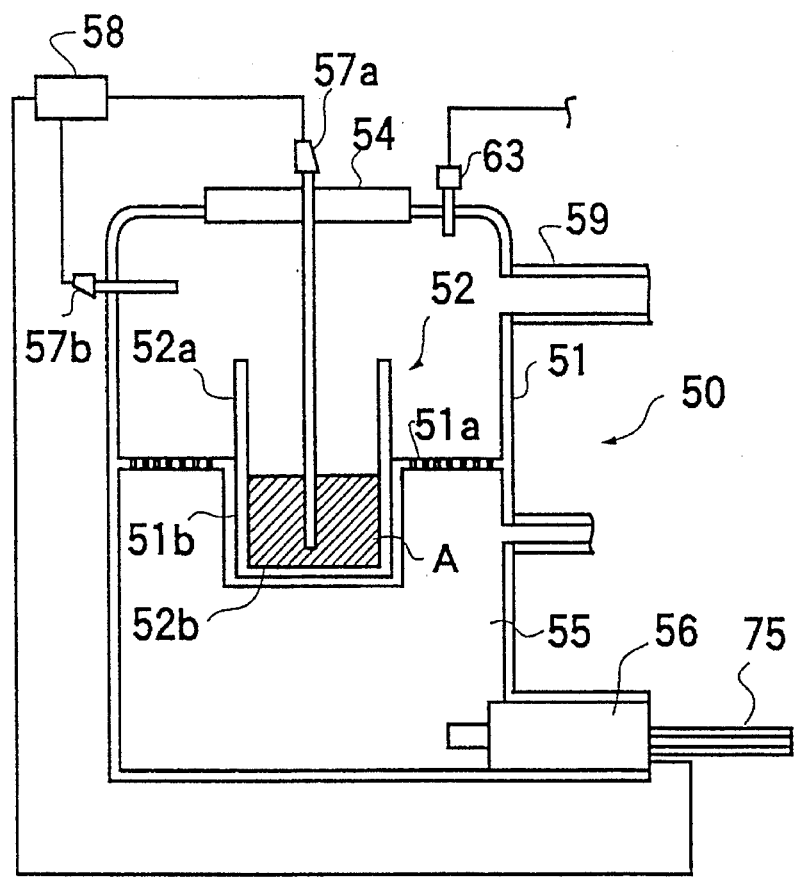
FIG. 6 is a vertically sectional view showing an exemplary configuration of a decomposition vessel which is used for performing the method of pyrolytically decomposing plastic materials according to the present invention.

An embodiment of the modified decomposition vessel of the double-pot structure is shown in FIG. 6.

The modified decomposition vessel 50 of FIG. 6 comprises an outer vessel 51 and an inner vessel 52. The outer vessel 51 is directly heated by heating means, and the inner vessel 52 is separable from the outer vessel 51. The inner vessel 52 which receives the waste plastic material to be pyrolytically decomposed is placed in the outer vessel 51. After the pyrolytic decomposition of the waste plastic material the inner vessel 52 with the residual product of the decomposed plastic material is taken off the outer vessel 51, and another portion of the waste plastic material is contained in another inner vessel 52 and put into the outer vessel 51 for performing the next decomposition treatment. During the next decomposition treatment, the removed inner vessel 52 is subjected to the scraping treatment for removing the residual product.

In the above-described construction, the outer vessel 51 is contrived to have a heat transferring portion, that is, a recess portion 51b for improving the heat transfer efficiency between the outer vessel 51 and the inner vessel 52. When the inner vessel 52 is put into the recess portion 51b and the outer and inner vessels 51 and 52 are heated to the temperature for pyrolytic decomposition operation, the surfaces of the recess portion 51b and the inner vessel 52 fittedly contacts with each other and the heat is directly transferred from the recess portion 51b to the inner vessel 52. Therefore, the heat is easily transferred. The recess portion 51b is constructed so that the heat is appropriately transmitted from the lower portion to the upper portion on the inner vessel 52.

According to the present invention, the details of an embodiment of the pyrolytic decomposition apparatus having a decomposition vessel of the double-pot structure will be described, with referring to the drawings.

Figure 7:
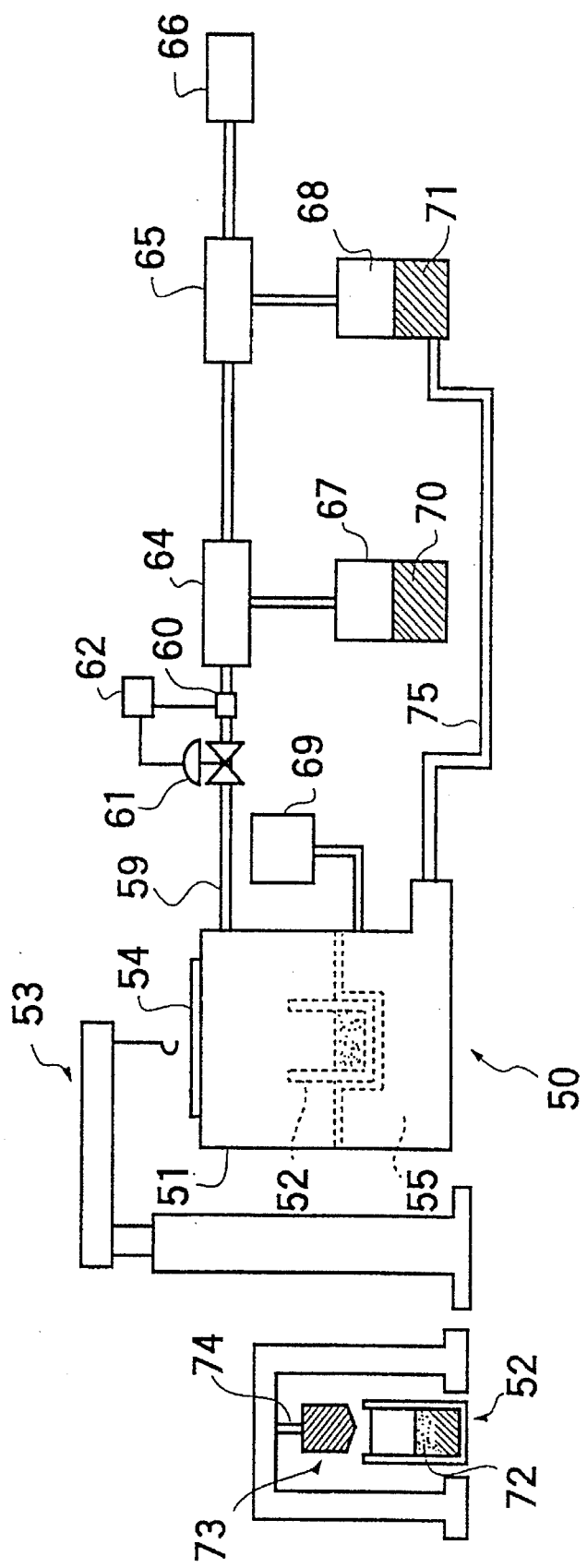
FIG. 7 is a schematic illustration of an exemplary configuration of the apparatus in which the decomposition vessel of FIG. 6 is employed for performing the method of pyrolytically decomposing plastic materials according to the present invention.

As shown in FIGS. 6 and 7, the pyrolytic decomposition apparatus comprises the outer vessel 51 and the inner vessel 52. The inner vessel 52 of this embodiment has a cylindrical side wall 52a and a circular bottom portion 52b. The inner vessel 52 also has a hook or a hand grip (not shown) for carrying the inner vessel 52. The inner vessel 52 is carried by using a jib crane 58. The outer vessel 51 has a hatch 54 which is opened and closed at the top of the outer vessel 51 for introducing the inner vessel 52 into the outer vessel 51. As shown in FIG. 7, the cylindrical recess portion 51b is formed on the center of a flat definition plate 51a of the outer vessel 51, and the inner vessel 52 is inserted into the recess portion 51b. On the bottom of the outer vessel 51 formed integrally is a combustion chamber 55 which is divided from the outer vessel 52 by the definition plate 51a. The outer vessel 51 including the definition plate 51a is heated by a burner 56 which is installed in the combustion chamber 55. During heating, the heat of the definition plate 51a is transmitted into the inner vessel 52 through the portion of the inner vessel 52 which contacts with the recess portion 51b. The definition plate 51a of FIG. 6 has a plurality of penetration holes at a portion surrouding the recess portion 51b.

Moreover, a thermal detector 57a for detecting the inside temperature of the inner vessel 52 extends through the hatch 54 to the inside of the inner vessel 52 placed in the outer vessel 51, and a thermal detector 57b for detecting the inside temperature of the outer vessel 51 penetrates the side wall of the outer vessel 51 to the inside of the outer vessel 51. The thermal detectors 57a and 57b are electrically connected to a thermal control operator 58 for controlling application of heat by the burner 56 by using the temperatures detected by the thermal detectors 57a and 57b as controlling variables.

The outer vessel 51 is connected with a pipe 59 for delivering the fuel gas produced by the pyrolytic decomposition of the waste plastic material to the outside of the outer vessel 51, and a flow meter 60 is provided on the pipe 59 in order to measure flow of the fluid or the fuel gas, as shown in FIG. 7. The pipe 59 is also provided with a control valve 61 for regulating the flow in the pipe 59, and the control valve 61 is controlled by a flow control operator 62 by using the flow measured by the flow meter 60 as a controlling variant, in addition, a pressure gage 63 for measuring the pressure of the gas in the outer vessel 51 is fitted to the outer vessel Moreover, the pipe 59 is connected to an exhaust gas treatment system 66 via a first condenser 64 and the second condenser 65. The first condenser 64 and the second condenser 65 are connected with a heavy fraction storing tank 67 and a light fraction storing tank 68, respectively.

According to the above-described construction, the waste plastic material is treated as follows.

First, for successfully dealing with halogen-containing plastic, an alkaline material such as sodium hydroxide and the like is added to broker, and flowable pieces or grain of the waste plastic material A as a promoter for accelerating elimination of halogen element from the halogen-containing plastic to prepare a mixture of the waste plastic material and the alkaline material. The mixture is poured into the inner vessel 52, and the inner vessel 52 is then taken onto the outer vessel 51 by the jib crane 53. With the hatch 54 opened, the inner vessel 52 with the waste plastic mixture is placed into the recess portion 51b. Next, the burner 56 is ignited to heat the definition plate 51a. During the heating, heat of the definition plate 51a is transmitted to the inner vessel 52 from the portion of the inner vessel 52 which contacts with the recess portion 51b of the definition plate 51a, so that the waste plastic material A is heated. With continuously heating, a gas product containing fuel constituents is produced by thermal decomposition of the waste plastic material and filled in the outer vessel 51, where property modification of the gas product is accelerated due to dry distillation.

The temperature of the waste plastic material being decomposed is detected by the thermal detector 57a, and combustion at the burner 56 is controlled in accordance with the detected temperature so that the inside temperature of the inner vessel 52 is preferably regulated within a range of 400° to 500° C. The gas product containing the gaseous fuel constituents flows in the piping system 59, while the flow of the gas product is appropriately controlled by means of the control valve 61. For example, opening and/or closing of the control valve 61 is performed in such a case that the pressure at the inside of the outer vessel 51 suddenly changes, or the like. The gas product then reaches the first condenser 62 in which the gas product is cooled and condensed, so that a fraction mainly composed of heavy oil constituents is liquefied and separated from the remaining gas product. The liquefied fraction is stored in the heavy fraction storing tank 67. The remaining gas product is further cooled by the second condenser 65, thereby another fraction mainly containing light constituents such as kerosine and the like is condensed and separated. The condensed second fraction is stored in the light fraction storing tank 68. The other fraction of the gas product being not liquefied is delivered to the exhaust gas treatment system 66 and treated so that it may be discharged and of no hazard.

After the pyrolytic decomposition of the waste plastic material is completed, the burner 56 is shut off to stop heating and the outer vessel 51 is cooled to a normal temperature or its vicinity. Completion of the decomposition reaction can be known from the phenomenon that the temperature at the inside of the inner vessel 52 raises, etc. Alternatively, the decomposition operation can be stopped by regarding the decomposition reaction as being completed when the amount of the obtained fuel product reaches a stoichiometric amount which is calculated from the initial amount of the waste plastic material. After the outer vessel 51 is cooled down, the hatch 54 is opened and the inner vessel 52 is taken out of the outer vessel 51 by the Jib crane 53. The decomposition residue remained in the inner vessel 52 is removed by using a scraping machine 73 with a rotational drive shaft 74 and the inner vessel 52 is cleaned. During scraping and cleaning of the inner vessel 52, another portion of the waste plastic mixture is subjected to pyrolytic decomposition by using another inner vessel. Since the place and circumstances which are selected for cleaning of the inner vessel 52 can be changed as necessity arises, it is possible to appropriately select them so as to prevent the worker from failing his health. If an oil fraction still remains in the decomposition residue, the decomposition residue can be used as solid fuel.

As shown in FIG. 7, the decomposition apparatus described above is constructed as the fuel product obtained by the pyrolytic decomposition can be used for combustion at the burner 56 by provision of a piping 75 for supplying the fuel product to the burner 56. The works for putting the waste plastic material into the inner vessel 52 and scraping away the decomposition residue can he performed at a place which is away from the outer vessel 51, and the inner vessel 52 to be aftertreated can be transported by a truck and the like.

Figure 8:
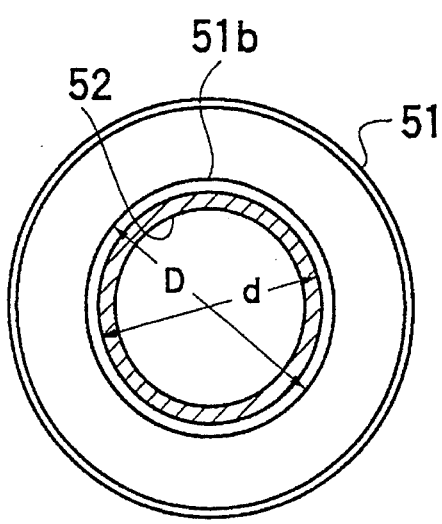
FIG. 8 is a horizontally sectional view of the decomposition vessel of FIG. 8.

In the decomposition apparatus described above, the diameter d of the inner vessel 52 and the diameter D of the recess portion 51b of the definition plate 51a are determined, as shown in FIG. 8, so that a small clearance is provided between the outer circumferential surface of the inner vessel 52 and the inner circumferential surface of the recess portion 51b of the definition plate 51a at a normal temperature. And the materials for the inner vessel 52 and the recess portion 51a are selected so that the rate of thermal expansion of the material of the inner vessel 52 is slightly greater than that of the definition plate 51a. By constructing as above, the inner vessel 52 at a normal temperature can be smoothly inserted into the recess portion 51b, and the circumference of the inner vessel 52 in heat contacts fittingly with the circumference of the recess portion 51b by thermal expansion of the materials. Therefore, heat conduction to the inner vessel 52 can be improved. For example, if the inner vessel 52 is made of austenite stainless steel and the definition plate 51a is made of a carbon steel, in combination, thermal expansion of the inner vessel 52 is larger than that of the recess portion 51b and they are suitably fitted to each other. When the materials are appropriately selected as described above, the inner vessel 52 and the recess portion 51b are designed so that the diametrical ratio: d/D is set to satisfy the expression: $0.7<d/D\leq0.98$, (if d or D is not a constant value in single embodiment, an average value taken in the region at which the inner vessel 52 contacts with the recess portion 51b. When the diametrical ratio d/D is equal to or less than 0.98, the setting operation of the inner vessel 52 into the recess 51b at a normal temperature is easy. However, if the diameter ratio is not higher than 0.7, it is difficult to obtain suitable heat conduction.

During the pyrolytic decomposition, the plastic material expands by heat and its height in the inner vessel 52 is remarkably increased, in particular, accordingly as bubbles are generated with progress of the decomposition reaction. As a result of this, the molten plastic material's level is raised, in general, to 1.2 to 1.5 times as high as that of the initial state, and, in some cases, it expands to twice or more. Therefore, it is preferred to limit the amount of the waste plastic material placed in the inner vessel 52 so that the top level of the placed plastic material is 0.25 to 0.85 times as high as the height or depth of the inner vessel 52. Moreover, if the heat is transmitted straight to the upper portion of the inner vessel 52, the plastic material is encouraged to expand upwards to overflow from the inner vessel 52. For this reason, it is preferred to dispose the heat transferring portion at the lower side of the inner vessel 52. In light of above, the height of the inner vessel 52 in the axial direction is suitably settled within a range of about 1.2 times to twice as long as the depth of the recess portion 51b.

By provision of the heat transferring portion constructed as described above, the heat of the outer vessel 51 can be directly transmitted to the inner vessel 52 without depending on airborne heat transfer. Therefore, energy can be responsively supplied to the inner vessel 52 so that the waste plastic material is quickly heated, and operation ability is thus improved.

In the pyrolytic decomposition operation for recovering fuel oil from waste plastic materials as described above, heat transfer efficiency is a very important factor for recovering the fuel product with high quality and consistency. However, the heat transfer efficiency changes in accordance with the ratio of the area of the contacting surface of the heat transfer portion relative to the volume of the waste plastic material to be pyrolytically decomposed. Accordingly, if the above area/volume ratio is preferably settle, a suitable heat transfer efficiency can be obtained and the decomposition operation can be effectively performed. If that volume has a cylindrical shape with a radius of 30 cm, such a preferable area/volume ratio is within a range of 0.04 to 0.9 $cm^2/cm^3$. On the other hand, the hight of the cylindrical volume is preferably settled within a range of r/10 to 10 r, in light of workability and reduction of decomposition residue.

According to the above-described construction, employment of the decomposition vessel of the double-pot structure and provision of the heat transfer portion enables to reduce time loss due to the cleaning of the decomposition vessel and to efficiently supply thermal energy. Therefore, total operation time in a case of repeating the decomposition operation with a batch-type decomposition vessel can be shortened and the throughput capacity can be raised.

Moreover, the double-pot structure has another advantage in that the amount of decomposition residue is reduced. In detail, when a single type decomposition vessel is used, a pretty amount of black residue is produced in the vessel, especially in the vicinity of the edge of the vessel. This is considered because the vessel is direct heated and the waste plastic is not uniformly heated. In comparison with this, if the double-pot type decomposition vessel having a heat transfer portion like the above is used and the plastic is contained in the inner vessel which is indirectly heated, heat transfer is improved more uniform and the amount of the black residue is smaller.

Figure 9:
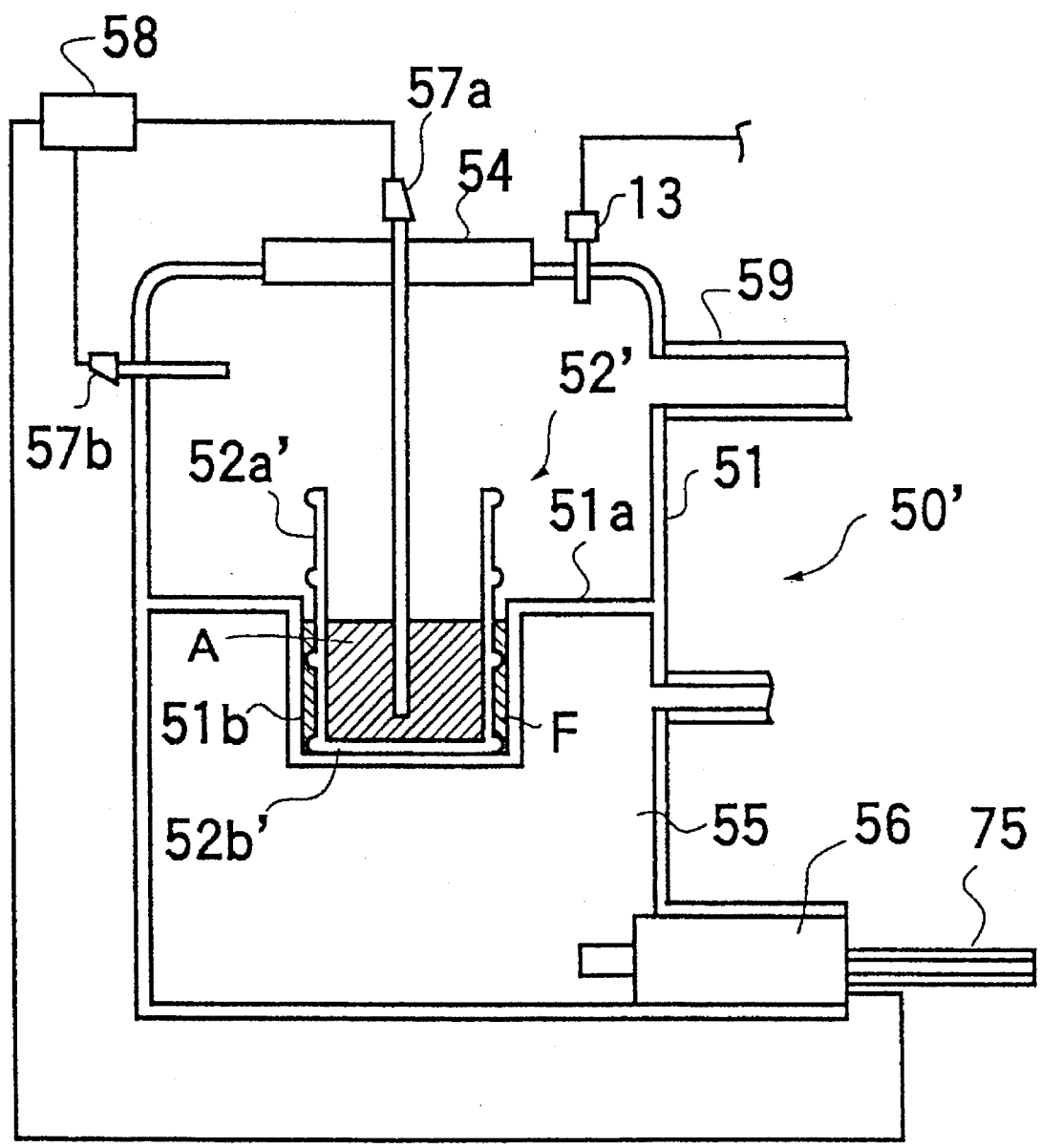
FIG. 9 is a vertically sectional view showing another exemplary configuration of a decomposition vessel which is used for performing the method of pyrolytically decomposing plastic materials according to the present invention.

FIG. 9 shows another embodiment of the decomposition vessel of the double-pot structure. In this decomposition vessel 50', a general-purpose metal drum 52' having a side wall 52a' and a bottom 52b' is employed as the inner vessel. In this embodiment, clearance may remain between the side wall 52a' of the metal drum 52' and the bore surface of the recess portion 51b even when the heat is applied, which causes deterioration of heat transfer efficiency. For solving this problem, a filler F with a low value of specific heat, specifically, a metal medium such as steel wool and the like, or, a liquid medium such as heavy oil and the like is filled in that clearance to form the heat transfer portion. Namely, interposition of a high conductive filler forms a heat transfer portion which fittingly contacts with the inner vessel. From the above description according to this embodiment, it can be understood that, even when the diameter ratio d/D of the double-pot decomposition vessel 50 of the former embodiment is lower than 0.7 and fitting ability is low, it can be improved by using the filler.

Figure 10:
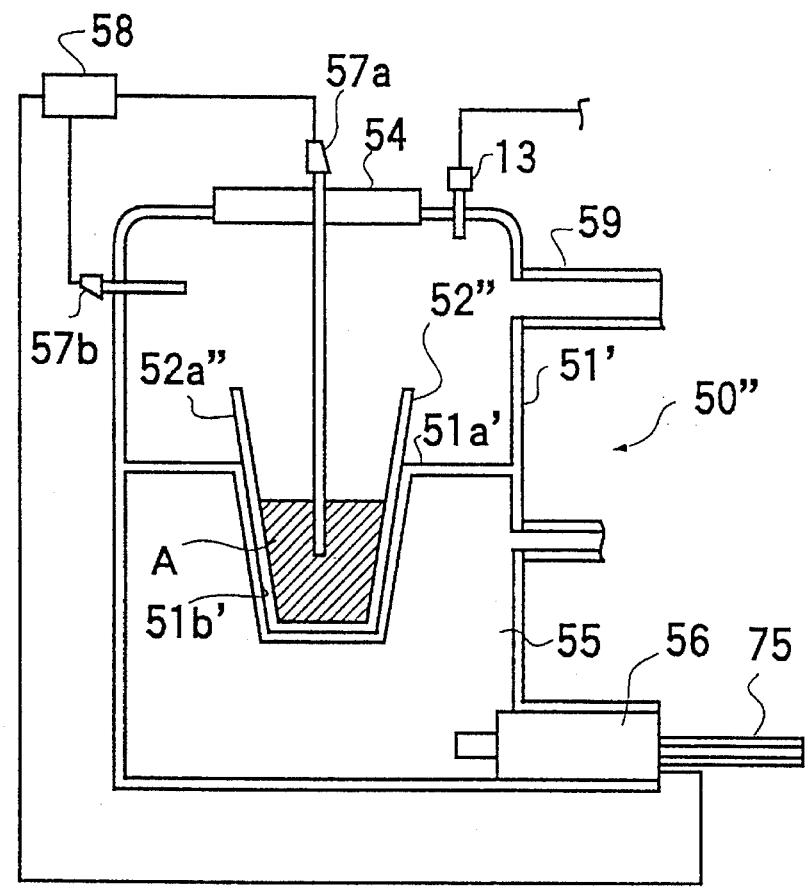
FIG. 10 is a vertically sectional view showing the third exemplary configuration of a decomposition vessel which is used for performing the method of pyrolytically decomposing plastic materials according to the present invention.
Figure 11:
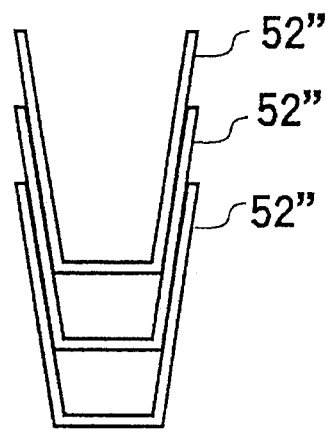
FIG. 11 is a vertically sectional view showing a plurality of the inner vessels of FIG. 10 which are piled up.

FIG. 10 shows a third embodiment of the decomposition vessel having a double-pot structure. In the apparatus 50" of the third embodiment, the inner vessel 52" of the double-pot type has a truncated conical shape. Accordingly, the corresponding recess portion 51b' of the definition plate 51a' of the outer vessel 51' also has a similarly truncated conical shape. According to the construction of the inner vessel and the recess portion as to having a tapered shape like this embodiment, the tapered surfaces work for guiding the inner vessel 52" to the right position during the insertion operation, while the side wall 52a" slides on the recess portion 51b'. Therefore, the inner vessel 52" can be easily inserted into the recess portion 51b', even when the position of the inner vessel 52" is slightly different from the recess portion 51'. As a result, strict operation control is no longer required for the transporting and positioning operation of the inner vessel 52" on the recess portion 51b'. Therefore, the operation of setting the inner vessel into the recess portion becomes quite easy. Moreover, even when a manufacturing difference is produced on the dimensions of the inner vessel and the recess portion, heat transfer during the heating can be completely achieved and damage of the decomposition vessel due to excessive expansion of the inner vessel can be prevented. In addition, the inner vessel 52" can sit well on the recess portion 51b'. Furthermore, since the conical inner vessel 51b' opens wide, the residual product can be easily removed from the inner vessel 52". The conical inner vessel also has another advantage in storage and transportation of the inner vessel. Specifically, a plurality of conical inner vessels 52" can be piled for reducing the space necessary for storing and transporting the inner vessels, as shown in FIG. 11.

Figure 5:
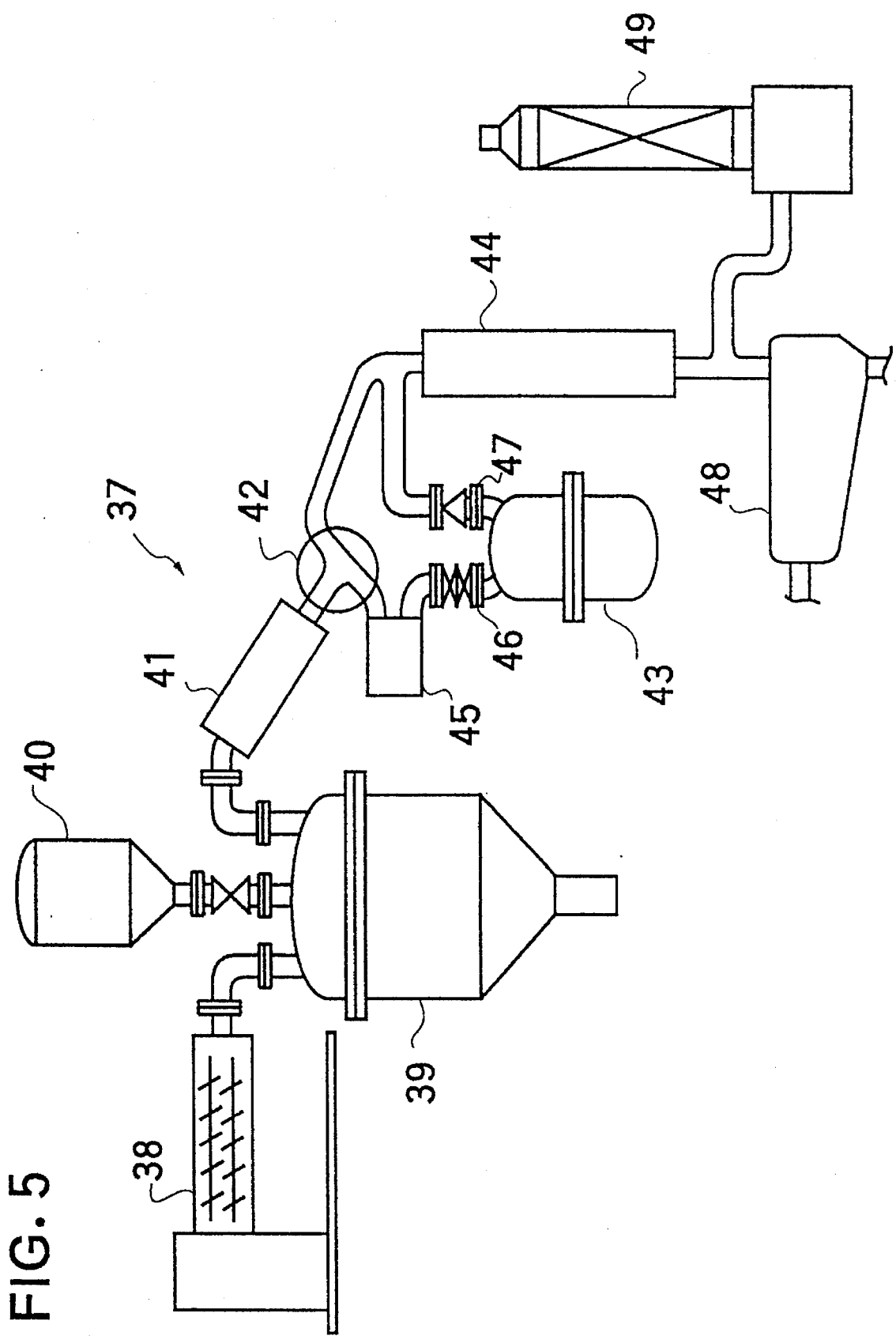
FIG. 5 is a schematic illustration of the fourth exemplary configuration of the apparatus for performing the method of pyrolytically decomposing plastic materials according to the present invention.
Figure 12:
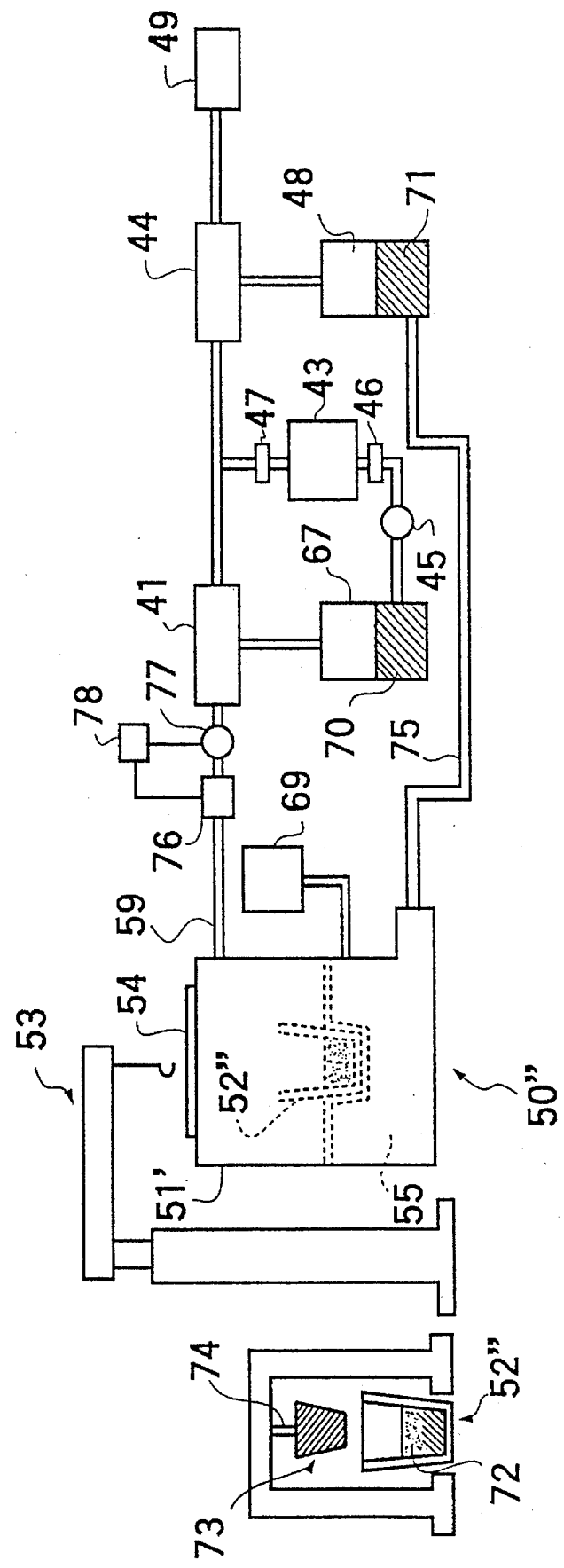
FIG. 12 is a schematic illustration of an exemplary configuration of the apparatus which includes two decomposition vessel having a double-potting structure.

FIG. 12 shows a decomposition system in which the double-pot structure of the decomposition vessel of FIG. 10 is incorporated into the basic construction of the apparatus of FIG. 5. Specifically, the first decomposition vessel 50" in which the decomposition operation is performed in an atmosphere at the normal pressure or a reduced pressure has an outer vessel 51' and an inner vessel 52", and the second decomposition vessel 43 in which the reaction atmosphere is pressurized also has the double-pot structure.

In the decomposition system of FIG. 12, the pressure of the atmosphere inside the first decomposition vessel 50" is controlled by mean of a pressure sensor 76, a vacuum pump 77 and a control unit 78 so as to set the pressure of the atmosphere to a normal pressure or a reduced pressure of a predetermined level. The liquid portion 70 condensed at the first condenser 41 is transported by a pump 45 to the inner vessel of the pressurized decomposition vessel 43 which is equipped with a check valve 48 and a pressure control valve 47, so that the liquid portion is further decomposed to produce the secondary decomposition gas product. It is condensed by the second condenser 44. The portion of the secondary decomposition gas product which is not liquefied by the second condenser 44 is treated by the exhaust gas treatment unit 49.

For all example of system control, setting of the system conditions for obtaining kerosine as the final product will be described below.

(first decomposition vessel 50") P: normal pressure, T: 300° to 650° C., preferably 300° to 500° C.

(second decomposition vessel 43) P: 1 to 10 kgf/cm², preferably about 4 kgf/cm² by gauge pressure, T: 400° to 500° C.

(first condenser 41) T: 200° to 300° C., preferably 200° to 250° C.

(second condenser 44) T: 50° to 100° C., preferably about 70° C.

In the above-described case, the other gas portion that is not liquefied by the second condenser 44 may contain more light fuel component such as gasoline. Therefore, a third condenser which cools the gas portion at a normal temperature for condensing and recoverring the gasoline component is incorporated into the exhaust treatment unit 49. After condensation of the gasoline component, the rest portion is subjected to neutralization treatment for neutralizing hydrogen chloride gas and afterburner treatment for burning hydrocarbon in the gas portion.

Figure 13:
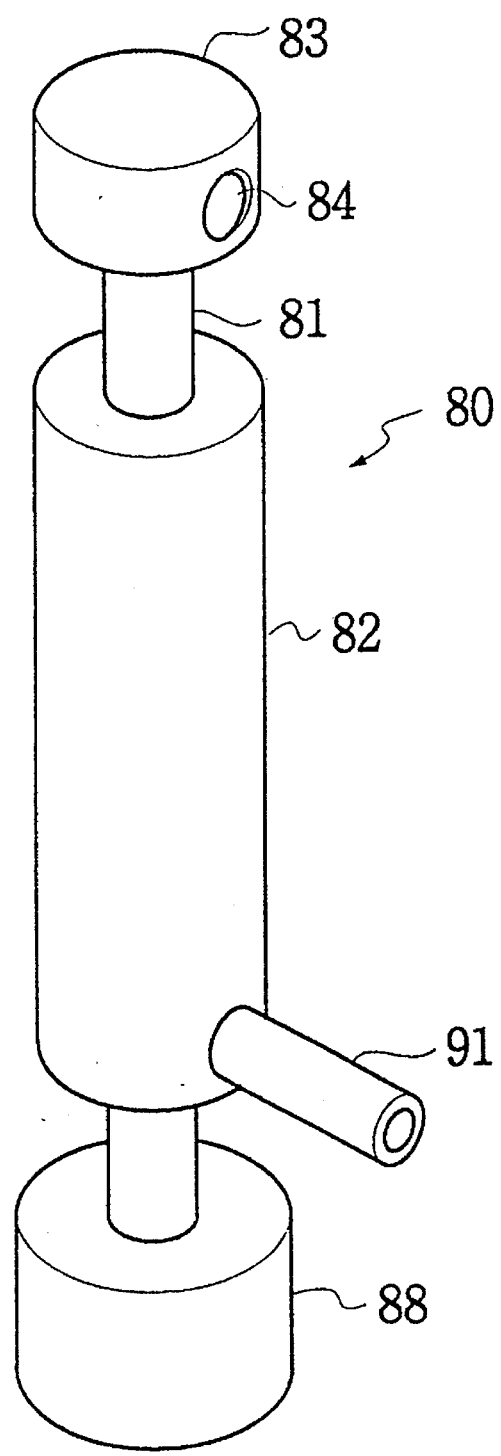
FIG. 13 is a perspective view showing an exemplary configuration of a double-tube reactor for performing pyrolytical decomposition of plastic materials according to the present invention.
Figure 14:
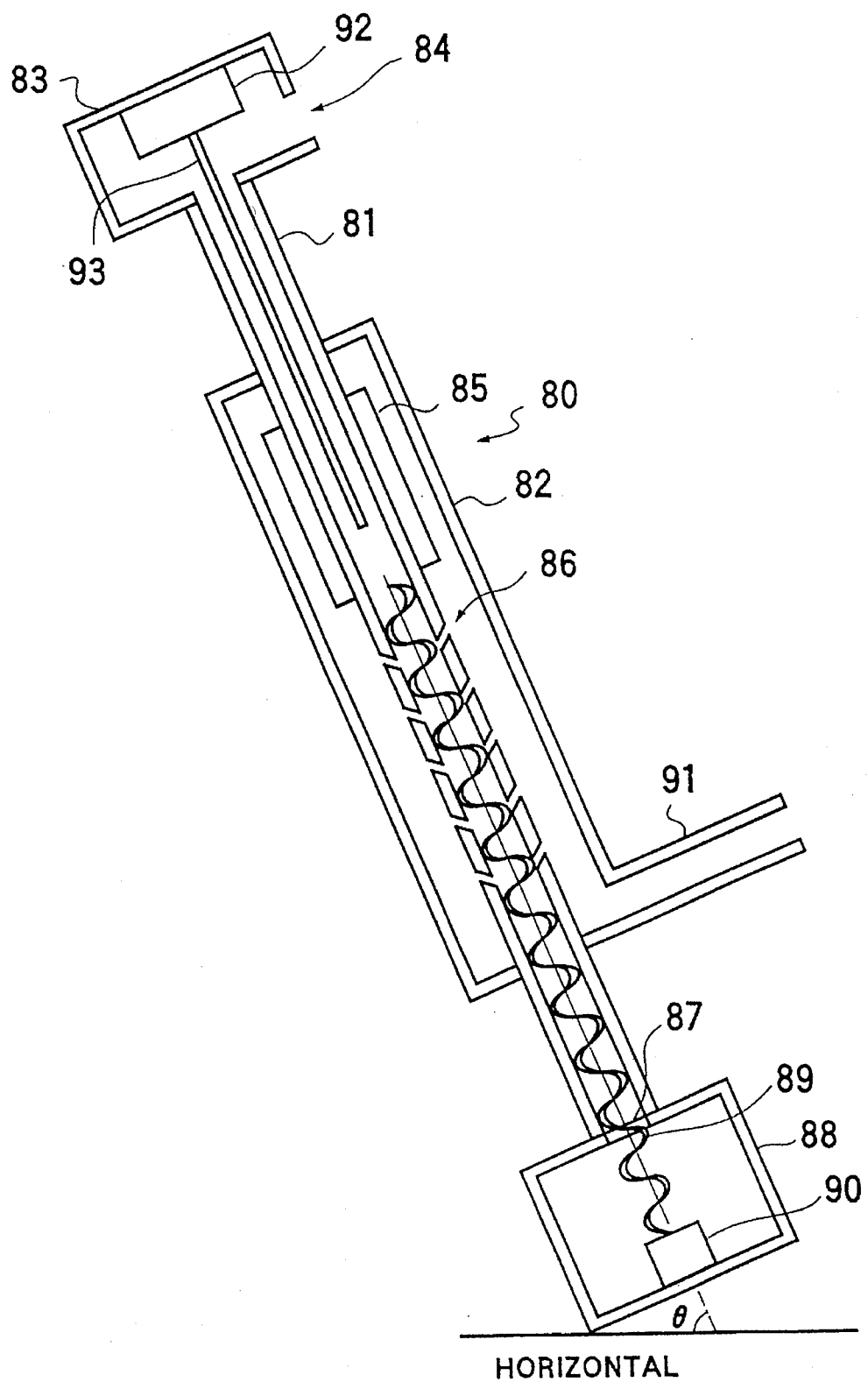
FIG. 14 is a sectional view of the double-tube reactor of FIG. 13.

As described above, in a case of decomposing a large amount of PVC resin by means of a batch type pyrolysis system, the decomposition residual always remains in the reaction vessel and the residual after completion of the decomposition reaction must be removed by scraping it before repeating the decomposition operation. Moreover, in the batch type pyrolysis system, the amount of the waste plastic material which can be treated in one operation time is limited by the capacity of the decomposition vessel. Therefore, improvement of the operation efficiency is rather difficult. However, if the pyrolytic decomposition of the waste plastic material can be continuously performed, the operational efficiency can possibly be improved. Therefore, realization of the continuous operation in pyrolytic decomposition of the plastic material which contains PVC resin is important. This can be accomplished by employment of a double-wall tubular pyrolysis reactor as a decomposition vessel.

with referring to the drawings, embodiments of the double-wall tubular pyrolysis reactor will be described below, FIGS. 13 is a perspective view of the double-wall tubular pyrolysis reactor 80 and FIG. 14 is a cross-sectional view showing the inner structure of the double-walk tubular pyrolysis reactor 80.

The double-wall tubular pyrolysis reactor 80 comprises an inner reactor tube 81 having a cylindrical shape and an outer tube 82 through which the inner reactor tube 81 passes. As shown in FIGS. 13 and 14, the inner reactor tube 81 has a pour portion 83 with a first opening or an inlet port 84 at one of the ends protruding from the outer tube 82. A flowable waste plastic material, mixed with an alkaline material for accelerating the chlorine elimination reaction, is poured into the inner reactor tube 81 through the inlet port 84. At the inside of the outer tube 82, a heater 85 as a means for heating the waste plastic poured from the inlet port 84 into the inner reactor tube 81 is located at the upper end of the outer tube 82 over a certain length of the outer circumference of the inner reactor tube 81. The rest portion of the inner reactor tube 81 at the inside of the outer tube 82 is perforated to have a multiple number of small holes for discharging the evaporated components produced from the heated and decomposed waste plastic material out of the inner reactor tube 81. The other protruding end of the inner reactor tube 81 has a second opening as an outlet port 87 for discharging the residue of the decomposed waste plastic material after discharge of the evaporated components from the small holes 86, and this opened end is connected to a residue storage 88.

The residue storage 88 is equipped with a screw shaft 89 as a means for extracting the decomposition residue from the inner reactor tube 81 and a rotational drive unit 90 for driving the screw shaft 89 to rotate with respect to the axis of the inner reactor tube 81. The screw shaft 89 axially extends from the residue storage 88 through the perforated portion of the inner reactor tube 81, and its tip end reaches the vicinity of the portion of the inner reactor tube 81 heated by the heater 85. The helical edge of the screw shaft 89 slidably makes contact with the inner bore surface of the inner reactor tube 81 so that the screw scrapes off and pulls out the decomposition residual and transfers it to the residue storage 88 in accordance with rotation of the screw shaft 89.

The residue storage 88 is provided with an aperture with a lid (not shown) for easily removing the decomposition residue from the residue storage 88. Alternatively, the residue storage 88 may be constructed as being detachably fitted to the inner reactor tube 81, instead of provision of the aperture and the lid.

The outer tube 82 encloses the main portion of the inner reactor tube 81, that is, both the portion surrounded by the heater 85 and the portion perforated with the holes 86, and the evaporated components produced from the heated and decomposed plastic are discharged from the small holes 86 into the space between the inner reactor tube 81 and the outer tube 82. The outer tube 82 is maintained at a predetermined constant temperature and works as a condenser for condensing a portion of the evaporated components. Therefore, the constituents contained in the condensed portion differs in accordance with the temperature of the outer tube 82. The outer tube 82 is connected to a pipe 91 whose temperature is maintained to the same temperature as that of the outer tube 82 for introducing the condensed portion from the outer tube 82. In a case where condensation by the outer tube 82 is used for separation of the light constituents from the heavy constituents, the outer tube 82 is preferably provided with another pipe for introducing the non-condensed light gas fraction out of the outer tube 82, separately from the pipe 91. In this ease, it is also possible to control the pressure inside the outer tube 82 by means of a pressure control valve and the like, Moreover, the pour portion 88 is equipped with a control operator 92 and a temperature sensor 93 which is connected to the control operator 92. The temperature sensor 93 is inserted into the inner reactor tube 81 and its tip end reaches the vicinity of the tip end of the screw shaft 89 at the inside of the heater 85. The thermal information detected by the temperature sensor 93 is output to the control operator 92 which controls the temperature of the heater 85 and rotation speed of the screw shaft 89 through the rotational drive unit 90 in accordance with the thermal information. In this connection, it is also possible to modify the controlling manner of the control operator 92 so as to change the temperature regulation of the heater 85 in accordance with the resistance to the rotational driving of the screw shaft 89 which changes due to the viscosity of the melted waste plastic material. Moreover, the directions of the inlet port 84 and the pipe 91 and the setting angle θ of the double-wall tubular pyrolysis reactor 80 relative to the horizontal can be changed as the necessity arises.

Next, operation of the double-wall tubular pyrolysis reactor 80 described above will be described.

Prior to the treatment by the double-wall tubular pyrolysis reactor 80, the waste plastic material to be poured from the inlet port 84 to the pour portion is transformed into a flowable state, for example, a molten mass or broken pieces. Preferably, the waste plastic material is melted and kneaded by using an extruder such as that described before and shown in FIG. 3, especially as a molten plastic material is used at the beginning of the operation. However, it is of course possible to change the plastic material from a molten plastic material to broken pieces. In a case of using the broken pieces of the plastic material, the added broken pieces are melted by the heater 85 on the previously melted portion.

The flowable waste plastic material is introduced to the heated portion of the inner reactor tube 81 by gravitational force. On the heated portion, the waste plastic material is heated and pyrolytically decomposed. During this process, the temperature of the plastic material being decomposed is detected by the temperature sensor 93. The control operator 82 operates in accordance with the temperature detected by the temperature sensor 93 and controls the heater 85 so that the waste plastic material is heated at the predetermined temperature while it passes through the portion of the inner reactor tube 81 heated by the heater 85. The thermal energy is regulated to allow a consistent and uniform supply of thermal energy to the waste plastic material.

With the proceeding pyrolytic decomposition reaction, the evaporated components separate from the plastic material and are discharged through the small holes 86 to the outside of the inner reactor tube 81. Then dry distillation of the evaporated components is accelerated in the space defined between the outer surface of the inner reactor tube 81 and the inner surface of the outer tube 82, namely the condensing space, thereby they are condensed and liquefied. The liquefied components are transferred to the subsequent steps via the pipe 91.

On the other hand, the decomposition residue produced in the inner reactor tube 81 is transported by the screw shaft 89 rotated by the rotational driving unit 90 to move to the residue storage 88. The decomposition residue taken from the inner reactor tube 81 is stored in the residue storage 88. Here, it is to be noted that the inlet port 84 and the tube 91 can be redirected in accordance with the conditions required for assembling of the whole decomposition system using the double-wall tubular pyrolysis reactor 80 and the other units.

As can be understood from the above description, when the double-wall tubular pyrolysis reactor 80 is utilized for pyrolytic decomposition of the waste plastic material, the waste plastic material can be continuously treated within the limitation of space remaining in the residual storage 88. Moreover, the decomposed components are evaporated from the surface of the waste plastic material, while the waste plastic is stirred by the rotating screw shaft 89 so as to be usually made uniform. Accordingly, the correct regulation of the decomposition reaction becomes easy and the decomposition of the plastic material is accelerated as well. In addition, since the edge of the rotating screw shaft 89 contacts the inner bore of the inner reactor tube 81, it is possible to prevent the decomposition residue from remaining in the inner reactor tube 81. Moreover, the stirring operation prevents the decomposition residue from sticking on the wall of the apparatus to form a large mass of hard solid. According to the structure of the stirring device, the decomposition residue is recovered from the residue storage 88 in the form of fine powder which can be easily handled.

The setting angle θ of the double-wall tubular pyrolysis reactor 80 relative to the horizontal can be appropriately changed in accordance with the kind of the plastic to be decomposed (single, mixture), the temperature of surrounding atmosphere, the temperatures of materials to be used, the viscosity of the melted plastic material, the reaction time of the plastic material and the kinds of additives to be appropriately used so that the flowable plastic material can move at a suitable speed in the inner reactor tube 81. If the viscosity of the flowable plastic material is high, or if the necessary decomposition time is relatively short, the setting angle θ is preferably settled in the vicinity of 90°.

Figure 15:
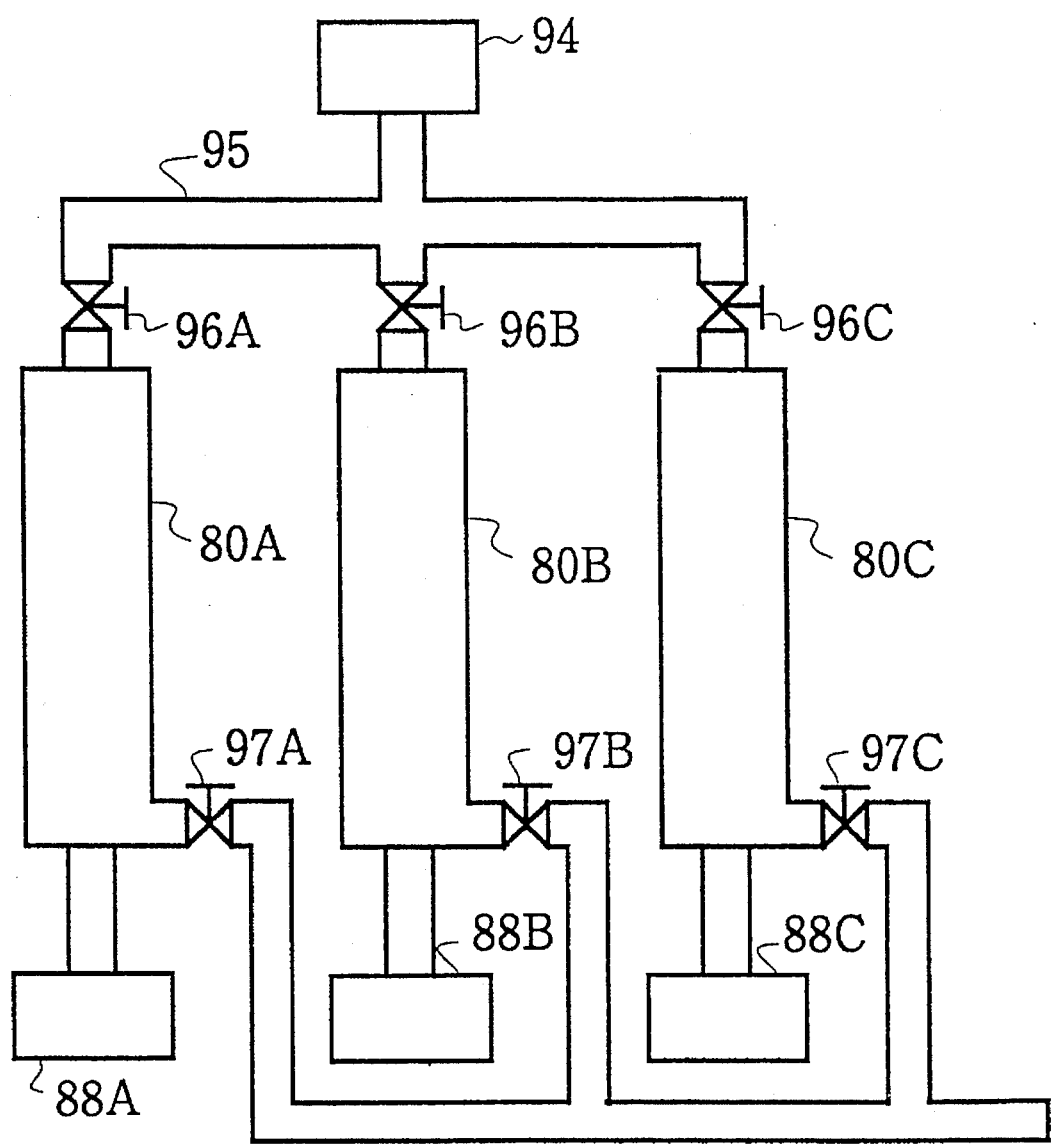
FIG. 15 is a schematic illustration of sn exemplary configuration of the apparatus in which the double-tube reactor of FIG. 13 is incorporated.

FIG. 15 shows an embodiment of a systematized assembly in which a plurality of the double-wall tubular pyrolysis reactors 80A, 80B, 80C are arranged in parallel. In the embodiment of FIG. 15, each of the double-wall tubular pyrolysis reactors 80A, 80B, 80C has essentially the same structure as the reactor 80 of FIG. 13, and they are modified to have a unified pour portion 94 instead of provision of the pour portion 83 on each pyrolysis reactor. The unified pour portion 94 is communicated to the tubular pyrolysis reactors 80A, 80B, 80C through a branched piping system 95 and inlet valves 96A, 96B, 96C each of which provided on each of the tubular pyrolysis reactors 80A, 80B, 80C, so that the flowable plastic material is delivered separately to each of the tubular pyrolysis reactors 80A, 80B, 80C. Moreover, the liquefied fuel portions produced at each of the tubular pyrolysis reactors 80A, 80B, 80C are collected and recovered via outlet valves 97A, 97B, 97C. The decomposition residue is stored in the residue storage 88A, 88B, 88C. The throughput of each of the tubular pyrolysis reactors 80A, 80B, 80C is controlled by operating the inlet valves 96A, 96B, 96C and the outlet valves 97A, 97B, 97C, respectively. In regard to the temperature sensor and the heater, they are separately incorporated into each of the tubular pyrolysis reactors 80A, 80B, 80C so that each tubular pyrolysis reactor can be operated individually.

In total operation control of the above systematized assembly, the time to start the decomposition treatment in each of the tubular pyrolysis reactors 80A, 80B, 80C is arranged so as not to coincide with each other so that either two of three tubular pyrolysis reactors 80A, 80B, 80C are in operation all the time. By this operation control, it becomes possible to eternally continue the pyrolytic decomposition treatment of the waste plastic material. Moreover, the amount of work for maintenance of the individual tubular pyrolysis reactor and the amount of decomposition residual to be removed can be reduced without decrease of the total throughput of the pyrolytic decomposition apparatus. Therefore, the works becomes easy and the operational efficiency increases.

The above systemized assembly can be further modified so as to provide a sensor on each of the residue storages 88A, 88B, 88C for detecting the amount of the decomposition residue stored in each of the residue storage and so as to automatically and separately control the inlet valves 96A, 96B, 96C and the outlet valves 97A, 97B, 97C in accordance with the detected amount of the decomposition residue.

Figure 16:
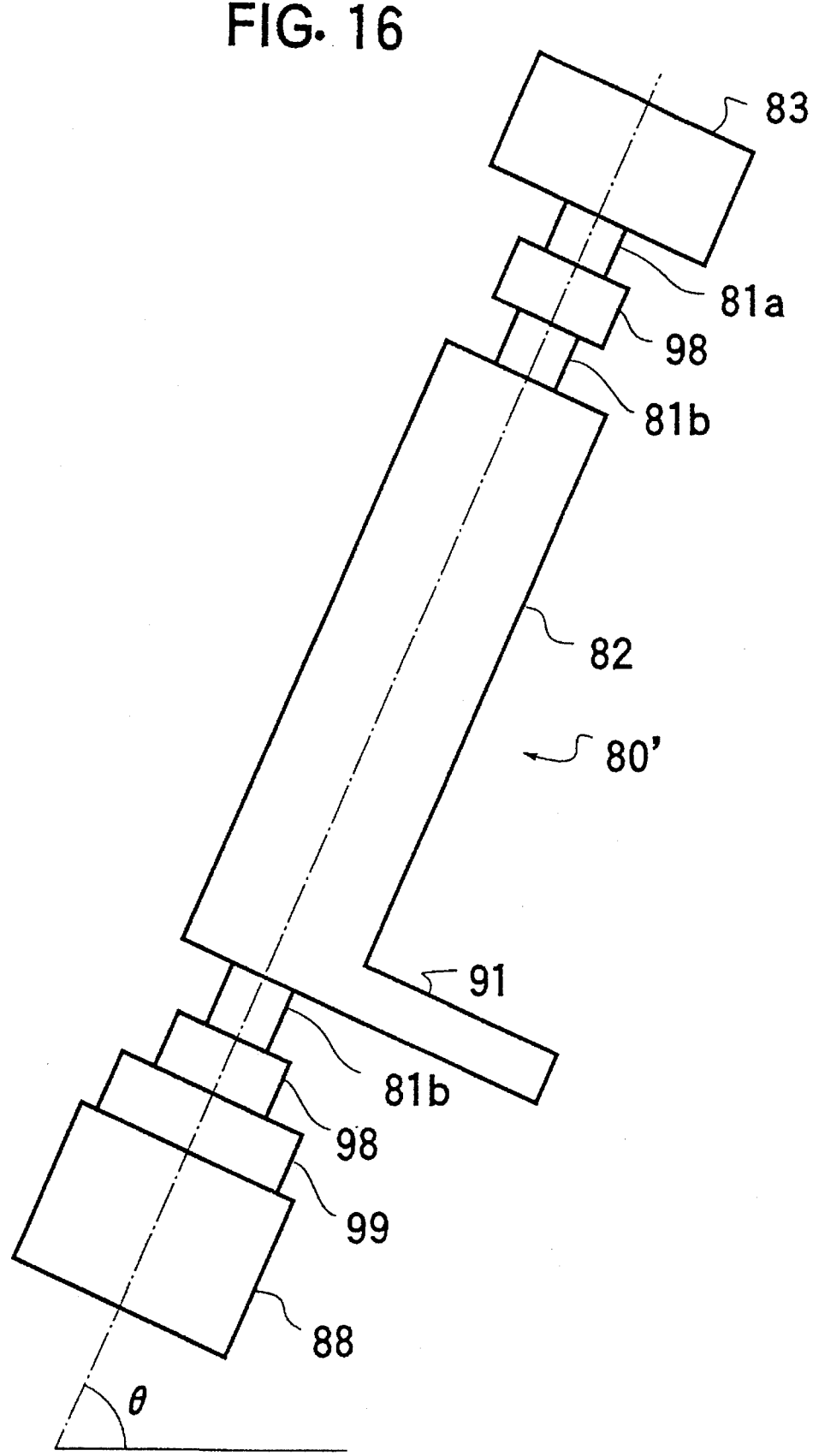

FIG. 16 shows a second embodiment of the double-wall tubular pyrolysis reactor. In this embodiment, the double-wall tubular pyrolysis reactor 80' is arranged at a setting angle θ, to incline off the vertical, and the inner reactor tube has a rotatable portion which is rotated by a rotational driving unit 98, instead of rotation of the screw shaft 89. In this embodiment, homogenizing of the decomposed plastic material can be similarly performed by rotation of the rotatable portion of the inner reactor tube and the decomposition residue can be continuously removed as well.

In detail, the inner reactor tube is separated into a fixed portion 81a and a rotatable portion 81b, and the rotational driving unit 98 which is controlled by a drive control unit 99 is fitted to the rotatable portion 81b. Namely, the rotatable portion 81b itself is rotationally driven. As a result, a fixed screw shaft (not shown) in the rotational portion 81b of the inner reactor tube is relatively rotated to the rotatable portion 81b, thereby the decomposition residue is delivered to the residue storage 88 in the same manner as that of the reactor 80 shown in FIGS. 13 and 14.

During rotation of the rotatable portion 81b of the inner reactor tube, the force for delivering the plastic material is given by the rotatable portion 81. In this connection, since the tubular reactor 80' is inclined off the vertical, the weight of the plastic material is applied to the wall of the rotational portion 81b. Therefore, the rotational force of the rotational portion 81b is easily transmitted to the plastic material.

Moreover, it is also possible to modify the tubular reactor 80' of FIG. 16 so that both the rotational portion 81b and the screw shaft 89 are rotated. In this case, the screw shaft 89 is controlled to rotate relative to the rotatable portion 81b so that the plastic material is delivered to the residue storage 88. It is preferred to rotate the rotatable portion 81b and the screw shaft 89 in opposite directions in view of energy efficiency.

When the double-wall tubular pyrolysis reactor as shown in FIGS. 13 to 16 is used as a pyrolytic decomposition vessel, the waste plastic material can be continuously supplied to the pyrolytic decomposition vessel without heating the decomposition treatment. Therefore, the amount of the plastic material to be treated may be changed in the middle of the decomposition operation. Moreover, the double-wall tubular pyrolysis reactor described above enables acceleration of the decomposition reaction, as well as it enables the decomposition residue to be more easily removed. Therefore, the amount of work imposed on the pyrolytic decomposition operation can be reduced.

In the present invention, each element in one embodiment of the pyrolytic decomposition system can, of course, be substituted with the similar element in another embodiment. For example, it is possible to combine the extruder 12 of FIG. 3 with the pyrolytic decomposition system shown in FIGS. 1 and 2 or that of FIG. 4 to use as the total decomposition system. Moreover, the decomposition vessels of FIGS. 6 and 9 and FIG. 10 can be used for the decomposition vessel in the decomposition system of FIG. 4 or FIG. 5. In addition, the reactors of FIGS. 13 to 16 can be used as the decomposition vessels for the systems shown in FIGS. 4, 5 and 7.

EXAMPLES

Referring now to the drawings and results of experiments, the preferred embodiments of the method and apparatus for pyrolytically decomposing plastic materials according to the present invention will be described.

1. Effect of Combined Steps of Thermally Decomposing under Pressure and Separating/Refluxing of Heavy Constituents Experiment 1

With a pyrolytically decomposing apparatus 1 which was constructed as shown in FIG. 1 and had a decomposition vessel 2 made of stainless steel, 100 g of polyethylene pellets were placed in the vessel 2, and each of pressure control valves 6 and 7 was set to regulate a gauge pressure to 4 $kgf/cm^2$, respectively. Next, a temperature of a separation column 3 was set to 300° C., and the decomposition vessel was heated at 450° C.

When the temperature of the polyethylene pellets rose to the decomposition temperature, the pressure inside of the decomposition vessel 2 began to increase, and pyrolysis gas was filled in the decomposition vessel 2 and the separation column 3. The moment the pressure inside them exceeded 4 $kgf/cm^2$, a part of the destructed gas was released to a recovery device 5, and the gauge pressure in each of the decomposition vessel 2 and the separation column 3 was reduced to 4 $kgf/cm^2$, respectively. Observing the gas releasing to a recovery device 5, a pump 4 was operated. Through the above process the pyrolysis gas was cooled in the separation column 3, and heavy constituents of it were liquefied, which were fed back to the decomposition vessel 2 by the pump 4 and subjected again to the thermal decomposition treatment.

The thermal decomposition treatment was continued for one hour after the temperature of the polyethylene pellets had reached the decomposition temperature, and 80 g of oil was recovered in a vessel 8. The obtained oil had been composed of 20% by weight of a light fraction (b.p. <150° C.) which corresponded to gasoline, 70% by weight of a middle fraction (b.p. 150° through 250° C.) which corresponded to kerosene and 10% by weight of wax component (b.p. >250° C.).

Experiments 2 through 11

In each of these cases, the procedure of Experiment 1 was repeated except that the values of gauge pressure set by the pressure control valves 6 and 7 and the temperature of the separation column 3 were varied as indicated in Table 1. The results are shown in Table 1.

Experiment 12

The apparatus 1 of FIG. 1 was modified such that the separation column 3, the pump 4 and the pressure control valve 6 was removed and the decomposition vessel 2 was connected directly to the control valve 7. In the apparatus having such a modified configuration, the procedure for thermal decomposition treatment of 100 g of polyethylene pellets at 450° C. was performed similarly to the cases described above.

other hand, by the results of Experiments 4 through 6, it is indicated that the rate of the light constituents in the pyrolysis gas increases in accordance with the increase of the pressure at the pyrolysis, such that the recovered oil becomes light. However, if the pressure is applied excessively, the amount of low-boiling gas constituents which are not condensed in the cooling tube of the recovery device 5 increases, so that the yield of the oil obtained through the recovery device decreases.

In the recovered oil of Experiment 7, the light fraction is contained at a high rate, but the yield of the recovered oil is low. Moreover, the thermal decomposition reaction was not completed in one-hour period in this case. Therefore, when the cooling temperature of the separation column 3 is lowered, it takes a long time to complete the decomposition reaction.

In Experiment 11, in spite of cooling and separating treatment adopted to the pyrolysis gas, the recovered oil was contaminated by a large amount of the constituents of heavy fraction. It is considered that this result is due to the amount of heavy constituents contained in the pyrolysis gas itself, and that it is also due to insufficient separating caused by the difficulty to condensate the heavy constituents under a low pressure. On the other hand, in Experiment 12, the oil can be recovered at a high yield due to the pressure applied during the decomposition reaction. However, the recovered oil contained a large amount of the wax component and had a high viscosity, because the pyrolysis gas was not subjected

TABLE 1

| case No. | cooling temp. of separation column 3 (°C.) | gauge pressure (kg/cm$^2$) | | oil product | | | |
|---|---|---|---|---|---|---|---|
| | | valve 6 | valve 7 | yield (wt %) | content (wt %) | | |
| | | | | | gasoline | kerosene | wax |
| Experiment 1 | 300 | 4 | 4 | 80 | 20 | 70 | 10 |
| Experiment 2 | 300 | 4 | 0 | 80 | 20 | 60 | 20 |
| Experiment 3 | 300 | 2 | 2 | 60 | 10 | 60 | 30 |
| Experiment 4 | 300 | 6 | 6 | 70 | 40 | 60 | 0 |
| Experiment 5 | 300 | 10 | 10 | 50 | 70 | 30 | 0 |
| Experiment 6 | 300 | 15 | 15 | 40 | 90 | 10 | 0 |
| Experiment 7 | 200 | 4 | 4 | 50 | 40 | 50 | 10 |
| Experiment 8 | 250 | 4 | 4 | 70 | 30 | 70 | 0 |
| Experiment 9 | 250 | 4 | 0 | 70 | 30 | 60 | 10 |
| Experiment 10 | 350 | 4 | 4 | 80 | 20 | 50 | 30 |
| Experiment 11 | 300 | 0 | 0 | 40 | 20 | 30 | 50 |
| Experiment 12 | — | 4 | — | 80 | 20 | 40 | 40 |

As shown in Table 1, 80 g of oil was recovered in Experiment 2. However, the recovered oil is composed of 20 by weight of a gasoline fraction, 60% by weight of a kerosene fraction and 20% by weight of a wax component. From the result in this experiment, it is considered that the degree of separation of the pyrolysis gas decreased due to the pressure inside of the separation column 3 which had been reduced to a normal pressure, in comparison with Experiment 1.

Moreover, the results of Experiment 3 and Experiment 11 indicate that, when the gauge pressure inside the decomposition vessel 2 is low, the yield of the recovered oil decreases and an amount of the heavy constituents contaminating the recovered oil increases. From these results, it can be clearly understood that a proportion of the heavy ingredients in the pyrolysis gas is increased in accordance with the decrease of the pressure which is applied during the thermal decomposition operation. Accordingly, it takes more time to sufficiently decompose the plastic into the constituents of light fraction when the applied pressure is insufficient. On the to the treatment of separating and feeding back the heavy constituents. In either ease, it is not possible to sufficiently remove the heavy constituents from the pyrolysis gas. In contrast, it can be clearly understood from the results of Experiments 1 through 10 in comparison with the Experiments 11 and 12 than the combination of the thermal decomposition treatment under increased pressure and the treatment of separating the heavy constituents from the pyrolysis gas can lead to an unexpectedly significant effect of reducing the proportion of the Heavy constituents in the recovered oil.

Experiments 13 through 17

In each of these experiments, the procedure of Experiment 1 was repeated except that the apparatus was further equipped with the catalyst 11 in the separation column 3 as shown in FIG. 2. Then, the yield and the content of the recovered oil product were measured. The results are shown in Table 2.

TABLE 2

| case No. | catalyst | oil product yield (wt %) | content (wt %) gasoline | kerosene | wax |
|---|---|---|---|---|---|
| Experiment 1 | — | 80 | 20 | 70 | 10 |
| Experiment 13 | activated alumina | 80 | 20 | 80 | 0 |
| Experiment 14 | zeolite | 80 | 20 | 80 | 0 |
| Experiment 15 | diatomaceous earth | 80 | 20 | 70 | 10 |
| Experiment 16 | silica | 80 | 20 | 70 | 10 |
| Experiment 17 | nickel oxide | 50 | 10 | 60 | 30 |

In each of the Experiments 13 and 14 in which activated alumina and zeolite was used as The catalyst 11, respectively. 80 g of oil containing no wax component was obtained. In either case, a proportion of the olefin ingredients in the oil was reduced, and proportions of the aromatic ingredients and the paraffin compounds are relatively increased.

In Experiments 15 and 16 using diatomaceous earth and silica as the catalyst 11, respectively, the effect of the catalyst 11 was absent. In Experiment 17 using nickel oxide as the catalyst 11, a rate of the wax component increased, and the yield of the oil was reduced. In any one of these three cases, a proportion of the olefin ingredients was hardly reduced.

In light of these results, it can be clearly understood that it is possible to improve the quality of the pyrolysis gas by using the activated alumina or zeolite as the catalyst 11, and the high quality fuel oil can be recovered.

2. Effects of Alkali and Water
Experiment 18

The apparatus 1 of Experiment 1 was modified such that the separation column 3, the pump 4 and the pressure control valve 8 were removed and the decomposition vessel 2 made of glass was connected directly to the control valve 7. Then, the control valve 7 was set to regulate a gauge pressure at 0 kgf/cm$^2$, and 18 g of non-rigid polyvinyl chloride (PVC) pellets having a particle size of 1 to 2 mm were placed in the decomposition vessel 2. Then, 18 g of sodium hydroxide was added as an additive to the PVC pellets, and the decomposition vessel 2 was continuously heated at a temperature of 450° C. for one hour in order to thermally decompose the PVC pellets. As a result of the thermal decomposition, 4 ml of oil was recovered in the vessel 8, and this amount corresponded to 20% by weight relative to the amount of PVC pellets used. The obtained product was an oil of light quality in which a raze of the fraction distilled at a temperature above 250° C. is less than 30% by weight, and mainly contained benzene, octene and 2-ethylhexanol.

The recovered oil was further subjected to the ion chromatography examination with a detection limit of 1 ppm, but, neither sodium nor chlorine was detected.
Experiment 19

The procedure of Experiment 18 was repeated except that the same amounts of PVC pellets and the sodium hydroxide as those in Experiment 18 were heated in the presence of 4 g of water in the decomposition vessel 2 in obtaining the oil product. Then, the yield and the content of the recovered oil were measured similarly. The results are shown in Table 3.
Experiments 20 through 38

In each of these experiments, the procedure of Experiment 19 was repeated except that the kind of the plastic pellets, the kind and the amount of the additive, and the amount of the water were varied, in obtaining the oil product in the vessel 8. Then, the yield and the content of the recovered oil were measured. The results are shown in Table 3. In Table 3, each of the amounts of the additive, the water and the oil product is represented by a number of part by weight relative to the amount of the plastic treated.

TABLE 3

| case No. | plastic | additive (pbw) | | water (pbw) | quality | yield (pbw) | detection of Na, Cl |
|---|---|---|---|---|---|---|---|
| Experiment 18 | PVC | NaOH | 1.0 | 0 | light | 0.2 | — |
| Experiment 19 | PVC | NaOH | 1.0 | 0.2 | light | 0.3 | — |
| Experiment 20 | PVC | Ca(OH)$_2$ | 1.0 | 0.2 | light | 0.2 | — |
| Experiment 21 | PVC | Mg(OH)$_2$ | 1.0 | 0.2 | light | 0.2 | — |
| Experiment 22 | PVC | KOH | 1.0 | 0.2 | light | 0.2 | — |
| Experiment 23 | PVC | NaOH | 0.2 | 0.2 | light | 0.2 | — |
| Experiment 24 | PVC | NaOH | 0.5 | 0.2 | light | 0.3 | — |
| Experiment 25 | PVC | NaOH | 2.0 | 0.2 | light | 0.3 | — |
| Experiment 26 | PVC | NaOH | 1.0 | 0.1 | light | 0.3 | — |
| Experiment 27 | PVC | NaOH | 1.0 | 0.5 | light | 0.3 | — |
| Experiment 28 | PVC | NaOH | 1.0 | 1.0 | light | 0.2 | — |
| Experiment 29 | PVC + PP(1:1) | NaOH | 1.0 | 0.2 | light | 0.6 | — |
| Experiment 30 | PVC + PP(1:1) | NaOH | 1.0 | 0.2 | light | 0.5 | — |
| Experiment 31 | PVC + PP(1:1) | NaOH | 1.0 | 0.2 | light | 0.5 | — |
| Experiment 32 | PVC | NaOH | 3.0 | 0.2 | heavy | 0.3 | Na |
| Experiment 33 | PVC | NaOH | 5.0 | 0.2 | heavy | 0.3 | Na |
| Experiment 34 | PVC | NaOH | 1.0 | 2.0 | heavy | 0.2 | — |
| Experiment 35 | PVC | — | — | — | heavy | 0.2 | Cl |
| Experiment 36 | PVC | — | — | 0.2 | heavy | 0.2 | Cl |
| Experiment 37 | PVC | Al$_2$O$_3$ | 1.0 | 0.2 | heavy | 0.2 | Cl |
| Experiment 38 | PVC | Fe$_2$O$_3$ | 1.0 | 0.2 | heavy | 0.1 | Cl |

In comparison with Experiment 18, the yield of the oil product obtained in Experiment 19 drastically increased up to 6 ml. Moreover, a rate of 2-ethylhexanol of the oil was drastically increased. From these results, the decomposition performance for the plasticizer contained in the PVC resin can be improved due to the addition of the water, such that the oil yield can be increased, From the results of Experiments 18 through 28, it can be clearly understood that, when the alkaline material is employed, the contamination of the recovered oil can be prevented by the chlorine compounds.

Moreover, the results of Experiments 29 through 31 demonstrate that it is possible to treat the PVC resin and the other non-PVC plastic containing no chlorine in the lump by the same pyrolytic decomposition operation without causing any problem. However, when the amount of alkaline material is excessive as in the cases of Experiments 32 and 33, the recovered oil was rather contaminated by alkali and composed of heavy constituents, although the contamination by the chlorine element can be prevented.

During the operation of Experiments 35, the phthalic acid, the phthalic anhydride and the like which are crystallizing on the wall of the recovery device 5 were observed after the beginning of decomposition treatment. Moreover, the same phenomenon was observed also in Experiment 36, but only after the whole water in the decomposition vessel 2 had been evaporated. In either case, the oil yield was low, in comparison with Experiment 19. From these results, it can be recognized that alkali substance such as the sodium hydroxide and the like and the water have the effect of promoting the decomposition of the PVC resin. In Experiment 36 in which 8 g (≈0.2 part by weight) of water had been added initially, 4 ml of aqueous liquid was recovered after finishing the thermal decomposition treatment, and this aqueous liquid was acidic. Accordingly, the recovered liquid can be regarded as containing hydrogen chloride, phthalic acid, etc. Moreover, in each of Experiments 35 through 38 in which the alkaline substance was not added, the recovered oil was contaminated by a large amount of some chlorine compounds such as chlorooctane and the like, so that these products are not suitable for fuel.

As described above, when the an alkaline substance and the water are added to the waste plastic containing the PVC resin, the generation of hydrogen chloride gas and the blocking phenomenon at the piping system of the pyrolysis apparatus can be prevented throughout the thermal decomposition treatment of the waste plastic. Moreover, the recovered oil has a good quality and contains no chlorine compound, and the decomposition performance can also be improved.

It can be also understood that the polyvinyl chloride resin and the waste plastic containing no polyvinyl chloride resin can be treated in the same pyrolysis condition in the presence of the water and the alkaline substance, without requiring a long period of time for recovering the oil product. The decomposition residue in the vessel 2 can be also easily taken care of afterwards.

3. Effects of Alkali and Water under increased Pressure

Experiment 39

The apparatus 1 of Experiment 1 was modified such that the separation column 8, the pump 4 and the pressure control valve 6 were removed, and the closed type decomposition vessel 2 made of stainless steel SUS F 304 which contained 8% of nickel and 18% of chromium in accordance with Japanese industrial Standard No. G3214 was connected directly to the pressure control valve 7, the recovery device 5 and the vessel 6. Then, the valve 7 was set at 1 atm by gauge pressure.

In the decomposition vessel 2, 20 g of polypropylene pellers having a particle size of 2 mm, 1 g of sodium hydroxide and 2 g of water were placed. Then the decomposition vessel 2 was heated up to 420° C., and the water vapour was generated in the decomposition vessel 2 as the temperature rises. The heat treatment at a temperature of 420° C. was continued for one hour, and the pressure inside the decomposition vessel 2 had been regulated to 1 atm by the pressure control valve 7. After finishing of the heat treatment, 20 ml of oil product was recovered, and the yield was 70% by weight relative to the amount of polypropylene pellets. The recovered oil contained mainly 2-methyl-1-pentene and 2,4-dimethyl-1-heptene. This oil can be classified as gasoline in accordance with the following standards.

(Classification Standards)

When the product contains at least 80% by weight of a fraction which is distilled at a temperature lower than or equal to 200° C. and which is composed of substances each of which having less than or equal to 11 of carbon elements, it is classified as gasoline; and when the product contains at least 20% by weight of a fraction which is distilled at a temperature higher than or equal to 300° C. and which is composed of substances each of which having more than or equal to 13 of carbon elements, it is classified as fuel oil.

Experiments 40 through 52

In each of these experiments, the procedure of Experiment 39 was repeated except that the kind of the plastic pellets, the kind and the amount of the additive, and the amount of water were varied, in obtaining the oil product in the vessel 8. Then, the yield and the content of the recovered oil were measured, and the oil quality was classified in accordance with the above-described classification standards. The results are shown in Table 4.

Experiment 53

The procedure of Experiment 39 was repeated except that the material of the decomposition vessel 2 was changed to martensite type stainless steel SUS F 410 which contained 0.14% of nickel and 12.95% of chromium in accordance with Japanese Industrial Standard No. G8214, in obtaining the oil product. Then, the yield and the content of the recovered oil were measured. The results are shown in Table 4.

Experiment 54

The procedure of Experiment 39 was repeated except that the material of the decomposition vessel 2 was changed to carbon steel S35A which is a mechanical structure material in accordance with Japanese Industrial Standard No. G3201 and contains neither nickel nor chromium, in obtaining the oil product. Then, the yield and the content of the recovered oil were measured. The results are shown in Table 4.

TABLE 4

| case No. | plastic | NaOH (wt %) | water (wt %) | gauge pressure (atm) | oil product quality | yield (%) |
| --- | --- | --- | --- | --- | --- | --- |
| Experiment 39 | PP | 5 | 10 | 1 | gasoline | 70 |
| Experiment 40 | PP | 0 | 10 | 1 | gasoline | 30 |
| Experiment 41 | PP | 2 | 10 | 1 | gasoline | 50 |
| Experiment 42 | PP | 20 | 10 | 1 | gasoline | 70 |
| Experiment 43 | PP | 50 | 10 | 1 | gasoline | 70 |
| Experiment 44 | PP | 5 | 30 | 1 | gasoline | 70 |
| Experiment 45 | PP | 5 | 50 | 1 | gasoline | 70 |
| Experiment 46 | PP | 5 | 10 | 5 | gasoline | 70 |
| Experiment 47 | PP | 5 | 10 | 10 | gasoline | 70 |
| Experiment 48 | PE | 5 | 10 | 1 | gasoline | 70 |
| Experiment 49 | PS | 5 | 10 | 1 | gasoline | 80 |
| Experiment 50 | PVC | 5 | 10 | 1 | gasoline | 30 |
| Experiment 51 | PP | 5 | 0 | 1 | fuel oil | 70 |
| Experiment 52 | PP | 5 | 10 | 0 | fuel oil | 80 |
| Experiment 53 | PP | 5 | 10 | 1 | gasoline | 60 |
| Experiment 54 | PP | 5 | 10 | 1 | gasoline | 60 | note)
PP: polypropylene, PE: polyethylene, PS: polystyrene, and PVC: polyvinyl chloride In Table 4, each of amounts of the sodium hydroxide, the water and the oil product are represented by percentage by weight relative to amount of the plastic used.

Experiments 40 through 43 demonstrate that, when the amount of the sodium hydroxide is less than 5% by weight, the decomposition performance is deteriorated, such that the yield of the oil product is decreased. Moreover, Experiments 44 through 47 and Experiments 51 and 52 indicate that the constituents of the oil product are shifted to a heavier molecular-weight range due to the lack of water and a low pressure during the pyrolysis operation. In the reaction system utilized in these experiments, it can be understood from the above results that a preferable range of the water is more than or equal to 10% by weight, and that of the gauge pressure to be applied is more than or equal to 1 atm.

On the other hand, in each one of Experiments 48 through 50, the recovered oil was classified as gasoline. From these results, it can be readily understood that, irrespective of a kind of the plastic to be treated, it is possible to recover the light-quality oil from a variety of waste plastics by thermally decomposing the waste plastics with the water and the sodium hydroxide under increased pressure. In the practical pyrolysis of waste plastic, it is however expected that the pyrolysis gas contains larger amount of heavy constituents due to the decomposition of mixture of various kinds of plastic materials. Nevertheless, even in such a case, the light quality oil can easily be obtained by using the pyrolysis method comprising the step of separating heavy constituent and feeding it back. This can be clearly understood from the results of Experiments 1 through 10 which were already explained above.

In each of Experiments 53 and 54, the material of the decomposition vessel 2 was changed to the martensite stainless steel and the carbon steel. In either case, the oil of good quality can be obtained. However, the decomposition vessel 2 was severely damaged. Therefore, these materials of the decomposition vessel 2 are not suitable for practical use in industry. Moreover, in comparison with Experiment 39, these experimental results suggest that the stainless steel containing 8% nickel and 18% chromium can produce a catalytic effect for the decomposition reaction. Consequently, the employment of this steel material for the decomposition vessel 2 enables the improvement of both the corrosion resistance of the apparatus and the recovery yield of the oil product.

4. Pyrolysis of Plastic with Thermoset Resin Experiment 55

First, 100 parts by weight of broken waste polypropylene was mixed with 10 parts by weight of broken waste sealing plastic which was produced during the transfer molding encapsulation of a semiconductor device with the sealing plastic. Next, using the apparatus of Experiment 18, the mixture was placed in the decomposition vessel 2. The pressure control valve 7 was set to 0 kgf/cm$^2$ by gauge pressure, and the decomposition vessel 2 was heated at a temperature of 500° C. for two hours. As a result, 80 parts by weight of oil was obtained, and the yield was 78% by weight relative to the total amount (100 parts by weight) of waste polypropylene and an accounted amount (=3 parts/10 parts of sealing plastic by weight) of organic compounds, i.e., epoxy resin, etc., which are contained in the waste sealing plastic for semiconductors device.

Experiments 56 through 58, 61 and 62

In each of these cases, the procedure of Experiment 55 was repeated except that the kind of the broken waste plastic and the amount of the sealing plastic were varied, in obtaining the oil product. Then, the amount of the recovered oil was measured, and the recovery yield was calculated. The results are shown in Table 5.

Experiments 59, 60, 83 and 64

In each of these cases, the procedure of each of Experiments 55, 57, 61 and 62 was repeated, respectively, except that the pressure control valve 7 was set to 8 kgf/cm$^2$ and the apparatus of Experiment 39 was used, in obtaining the oil product. Then, the amount of the recovered oil was measured, and the recovery yield was calculated. The results are shown in Table 5.

TABLE 5

| case No. | plastic (part by weight) | | | gauge pressure (atm) | oil product | |
|---|---|---|---|---|---|---|
| | PP | PS | sealing resin | | amount (pbw) | yield (%) |
| Experiment 55 | 100 | — | 10 | 0 | 80 | 78 |
| Experiment 56 | 100 | — | 20 | 0 | 85 | 80 |
| Experiment 57 | — | 100 | 10 | 0 | 75 | 73 |
| Experiment 58 | — | 100 | 20 | 0 | 80 | 75 |
| Experiment 59 | 100 | — | 10 | 3 | 85 | 83 |
| Experiment 60 | — | 100 | 10 | 3 | 80 | 78 |
| Experiment 61 | 100 | — | — | 0 | 70 | 70 |
| Experiment 62 | — | 100 | — | 0 | 65 | 65 |
| Experiment 63 | 100 | — | — | 3 | 83 | 83 |
| Experiment 64 | — | 100 | — | 3 | 78 | 78 | note)
PP: polypropylene, PS: polystyrene

As shown in Table 5, when the sealing plastic was mixed with the broken waste polypropylene, the amount of the recovered oil is larger than those without the sealing plastic. Therefore, these results clearly demonstrate that the recovery yield of the oil can be improved by the addition of the sealing plastic.

In each case of Experiment 55 through 60, the obtained oil was composed of a fraction which is distilled at 50° C. to 350° C. In light of the results of Experiments 1 through 10, these results sufficiently teach that, in the presence of the silica-containing thermoset plastic, the waste plastic can be efficiently converted into high-quality oil like gasoline by using the method comprising the steps of separating heavy constituents from the pyrolysis gas and feeding it back.

Consequently, in the presence of the thermoset plastic containing silicon dioxide such as the sealing plastic for semiconductor devices, the thermoplastic waste plastic such as the polypropylene and the like can be pyrolytically decomposed without causing any problem, with the increase of the recovery yield of the oil.

5. Effects of Heat Transfer Medium, Decomposition Reaction Catalyst and Water

Experiment 65

With the apparatus of Experiment 18, the pressure control valve 7 was set to 0 kgf/cm$^2$ by gauge pressure, and 2 liters of silicone oil was placed in the decomposition vessel 2 as the heat transfer medium. Next, 1 kg of waste polypropylene plastic was broken into pieces having a diameter of about 2 cm, and they were added to the silicone oil in the decomposition vessel 2. In addition, 1 kg of water and 100 g of nickel oxide as a catalyst were added to the silicone oil, and the decomposition vessel 2 was closed. Then, a small amount of waste plastic was burned inside the decomposition vessel 2 to reduce the oxygen concentration in the decomposition vessel 2 to 15% by volume. After that, the decomposition vessel 2 was heated at a temperature of 500° C. for two hours. As a result, 1.0 liter of the oil was obtained, which can be classified as "fuel oil A" in accordance with Japanese Industrial Standards. At the same time, 100 cc of incondensible gas and 100 cc of tar were recovered.

Experiments 66 through 84 and 89 through 92

In each of these cases, the procedure of Experiment 65 was repeated except that the kind of the heat transfer medium, the kind of the decomposition catalyst, the amount of the water added and the kind of the waste plastic were varied as indicated in Table 6, in obtaining the oil product. Then, the yield and the quality of each oil product were measured. The results are shown in Tables 6-1 and 6-2.
Experiments 85 through 88 and 93 through 96

In each of these cases, the procedures of each of Experiments 65, 82 through 84 and 89 through 92 were repeated, respectively, except that the pressure control valve 7 was set to 3 kgf/cm² by gauge pressure and the apparatus of Experiment 39 was used, in obtaining the product. Then, the yield and the quality of each oil product were measured. The results are shown in Tables 6-1 and 6-2.

transfer medium, the catalyst, and the water can be achieved also in a case of the pyrolysis under increased pressure.

Consequently, in light of the above-described results, it can be readily understood that the pyrolysis method utilized in Experiments 1 through 10 can accomplish the further improvement of the quality and the yield of the recovered oil product by using the heat transfer medium, the catalyst and the additive as demonstrated by the experiments shown in Table Nos. 6-1 and 6-2.

Moreover, it must be clearly understood that the product obtained by the pyrolysis method according to the present

TABLE 6-1

| case No. | plastic | medium | catalyst | water (kg) | gauge pressure (kg/cm²) | oil product quality | amount (l) |
|---|---|---|---|---|---|---|---|
| Experiment 65 | PP | silicone | NiO | 1.0 | 0 | fuel oil A | 1.0 |
| Experiment 66 | PP | silicone | — | — | 0 | fuel oil A | 0.7 |
| Experiment 67 | PP | — | NiO | — | 0 | fuel oil A | 0.8 |
| Experiment 68 | PP | — | — | 1.0 | 0 | fuel oil A | 0.8 |
| Experiment 69 | PP | silicone | NiO | — | 0 | fuel oil A | 0.9 |
| Experiment 70 | PP | silicone | — | 1.0 | 0 | fuel oil A | 0.9 |
| Experiment 71 | PP | molten salt | NiO | 1.0 | 0 | fuel oil A | 1.0 |
| Experiment 72 | PP | molten salt | $Fe_2O_3$ | 1.0 | 0 | fuel oil A | 1.0 |
| Experiment 73 | PP | molten salt | $Co_2O_3$ | 1.0 | 0 | fuel oil A | 1.0 |
| Experiment 74 | PP | silicone | CuO | 1.0 | 0 | fuel oil A | 1.0 |
| Experiment 75 | PP | silicone | $MnO_2$ | 1.0 | 0 | fuel oil A | 1.0 |
| Experiment 76 | PP | silicone | $SiO_2$ | 1.0 | 0 | fuel oil A | 1.0 |
| Experiment 77 | PP | silicone | $ZrO_2$ | 1.0 | 0 | fuel oil A | 1.0 |
| Experiment 78 | PP | silicone | $TiO_2$ | 1.0 | 0 | fuel oil A | 1.0 |
| Experiment 79 | PP | silicone | NiO | 0.5 | 0 | fuel oil A | 0.9 |
| Experiment 80 | PP | silicone | NiO | 1.5 | 0 | fuel oil A | 1.0 |
| Experiment 81 | PP | silicone | NiO | 2.0 | 0 | fuel oil A | 0.9 | note
PP: polypropylene, and molten salt: 7 mol % $NaNo_3$—44 mol % $KNO_3$—49 mol % $NaNO_2$.

TABLE 6-2

| case No. | plastic | medium | catalyst | water (kg) | gauge pressure (kg/cm²) | oil product quality | amount (l) |
|---|---|---|---|---|---|---|---|
| Experiment 82 | PE | silicone | NiO | 1.0 | 0 | fuel oil A | 0.3 |
| Experiment 83 | PS | silicone | NiO | 1.0 | 0 | fuel oil A | 0.9 |
| Experiment 84 | PVC | silicone | NiO | 1.0 | 0 | fuel oil A | 0.2 |
| Experiment 85 | PP | silicone | NiO | 1.0 | 3 | kerosene | 1.0 |
| Experiment 86 | PE | silicone | NiO | 1.0 | 3 | kerosene | 1.0 |
| Experiment 87 | PS | silicone | NiO | 1.0 | 3 | kerosene | 1.0 |
| Experiment 88 | PVC | silicone | NiO | 1.0 | 3 | kerosene | 0.2 |
| Experiment 89 | PP | — | — | — | 0 | fuel oil C | 0.7 |
| Experiment 90 | PE | — | — | — | 0 | fuel oil C | 0.3 |
| Experiment 91 | PS | — | — | — | 0 | fuel oil C | 0.6 |
| Experiment 92 | PVC | — | — | — | 0 | fuel oil C | 0.2 |
| Experiment 93 | PP | — | — | — | 3 | gas oil | 1.0 |
| Experiment 94 | PE | — | — | — | 3 | gas oil | 0.9 |
| Experiment 95 | PS | — | — | — | 3 | gas oil | 1.0 |
| Experiment 96 | PVC | — | — | — | 3 | gas oil | 0.1 | note
PP: polypropylene, PE: polyethylene, PS: polystyrene, and PVC: polyvinyl chloride In comparing Experiments 65 through 84 with Experiments 89 through 92, it can be understood that the use of any one of the heat transfer medium, the catalyst or the water has the clear effects for increasing the yield of the oil product and making the oil quality light. Moreover, in the Experiments 65 through 84, the amounts of tar and incondensible gas were reduced. The similar effects can also be found from the results of Experiments 85 through 88 in comparison with Experiments 93 through 96. Therefore, the effects of the heat transfer medium, the catalyst and the water can be achieved also in a case of the pyrolysis under increased pressure.

invention can be successfully utilized as a fuel without causing problematic air pollution, because of its prominent oil quality with few regard to the small amount of tar components contained therein.

Experiment 97

In the pyrolytically decomposing apparatus 1 of Experiments 1, 100 kg of broken polypropylene plastic were placed in the decomposition vessel 2, and each of the pressure control valves 6 and 7 was set to regulate a gauge pressure at 4 kgf/cm². Then, the decomposition vessel 2 was heated to 420° C. by using kerosene as a fuel. About 30 minutes after initiation of the heat, recovery of the oil initiated. At this time, supply of the kerosene was stopped, and the recovered oil was supplied in turn for heating the decomposition vessel 2. After two hours of the heating, the decomposition reaction was completed, and the oil was obtained at a total amount of 80 kg. The amount of the oil used for heating the decomposition vessel 2 was 30 kg, and the amount of the kerosene used initially during the period of 30 minutes was 10 kg.

In light of this result, it can be clearly understood that it is possible to cover the energy necessary for the pyrolytic decomposition of the plastic materials by using a part of the oil recovered by the pyrolytic decomposition as an energy source for heating the decomposition vessel of the pyrolytically decomposing apparatus.

6. The effect of the double-step decomposition process (Experiment 98)

With using the pyrolytic decomposition apparatus 37 of FIG. 5, 100 parts by weight of waste plastic mixture was introduced into the extruder 38. In the extruder 38, the waste plastic mixture was heated from the normal temperature up to 300° C. and melted, while it was kneaded. During this operation, elimination reaction of hydrogen chloride from the PVC resin proceeded in the waste plastic mixture. The melted plastic mixture was then continuously poured into the first reaction furnace 39. To the melted plastic mixture, 5 parts by weight of sodium hydroxide and 1 part by weight of water were added from the additive container 40 and heated to a temperature of 420° to 450° C. Pyrolytic decomposition reaction of the melted polyolefinic plastic and decomposition of the plasticizer agent contained in the plastic mixture proceeded to produce decomposition gas.

The decomposition gas was introduced into the first condenser 41 so as to cool the decomposition gas to a temperature of 250° to 300° C. thereby a portion of the decomposition gas was liquefied. The liquefied portion was separated from the remaining gas portion at the vapor-liquid separator 42 and supplied via the pressure pump 45 into the second reaction furnace 43 with the check valve 46 and the pressure control valve 47. The remaining gas portion was introduced into the second condenser 44.

The liquefied portion was heated again to a temperature of 420° to 450° C., while it was further pyrolytically decomposed. During this operation, the pressure inside the second reaction furnace 43 was increased by vaporization of the liquefied portion and maintained to 4 kgf/cm$^2$ gauge pressure by the pressure control valve 47. The pyrolytically decomposed portion was discharged from the second reaction furnace 43 into the second condenser 44 so that the secondary decomposed portion was cooled with the remaining gas portion of the first decomposed product at a temperature in the vicinity of the normal temperature to condense it into the final liquid product. The final liquid product was reserved in the recovery container. On the other hand, the remaining gas portion which was not liquefied in the second condenser 44 was introduced into the exhaust gas treatment unit 49 in which the gas portion was washed by an alkaline material, burned by a burner, and then discharged to the outside.

As a result of the above operation, 20 parts by weight of hydrogen chloride was discharged from the extruder 38. In the first reaction furnace, 70 parts by weight of decomposition gas was produced, and 15 parts by weight of a soft residual composed of a carbon material had been remaining in the bottom of the first reaction furnace, which was discharged from an outlet. Or the 70 parts by weight of the above decomposition gas, a portion of about 20 parts by weight was liquefied in the first condenser 41, which was further decomposed in the second reaction furnace. In the recovery container 48 recovered were 60 parts by weight of oil and 1 part by weight of water, and 10 parts by weight of gas was discharged from the exhaust gas treatment unit 49.

According to GC-MS analysis of the obtained oil, it was determined that the obtained oil was composed of hydrocarbon compounds having 4 to 18 carbon atoms, and no organic chlorine-containing compound was detected.
(Experiment 99)

The extruder 38 was removed from the decomposition apparatus 87 of FIG. 5, and 100 parts by weight of waste plastic mixture, 30 parts by weight of sodium hydroxide and 5 pares by weight of water were put into the first reaction furnace 89. Then, the decomposition operation of Experiment 98 was repeated under the same reaction conditions, excepting that the melting/kneading operation was not carried out.

After the above operation, 50 parts by weight of decomposition residue remained in the first reaction furnace 39, and the residue contained salt because the hydrogen chloride which was produced from the PVC resin was neutralized with the alkaline material in the above operation. From the recovery container 48 recovered were 60 parts by weight of oil and 15 parts by weight of water. In addition, 10 parts by weight of gas was discharged from the exhaust gas treatment unit 49.

According to GC-MS analysis of the recovered oil, it was measured that the obtained oil was composed of hydrocarbon compounds having 4 to 18 carbon atoms, and no organic chlorine-containing compound was detected.
(Experiments 100)

With using the pyrolytic decomposition apparatus 37 of FIG. 5, the decomposition operation of Experiment 98 was repeated under the same reaction conditions, excepting that no sodium hydroxide and no water were added.

As a result of the above operation, 20 parts by weight of hydrogen chloride was discharged from the extruder 38. In the first reaction furnace, 70 parts by weight of decomposition gas was produced, and the rest (10 parts by weight) was discharged from the outlet at the bottom of the first reaction furnace 39 in the form of a soft residual composed of a carbon material. Of the 70 parts by weight of the above decomposition gas, a portion of about 30 parts by weight was liquefied at the first condenser 41, which was further decomposed at the second reaction furnace. Into the recovery container 48 recovered was 60 parts by weight of oil, and 10 parts by weight of gas was discharged to the outside.

According to GC-MS analysis of the recovered oil, it was determined that the obtained oil was composed of hydrocarbon compounds having 4 to 18 carbon atoms, and no organic chlorine-containing compound was detected.
(Experiment 101)

The first condenser 41 was removed from the decomposition apparatus 37 of FIG. 5, and the decomposition operation of Experiments 100 was repeated under the same reaction conditions, excepting that the condensation operation by the first condenser 41 was omitted.

As a result of the above operation, 20 parts by weight of hydrogen chloride was discharged from the extruder 38. In the first reaction furnace. 70 parts by weight of decomposition gas was produced, and the rest (10 parts by weight) was discharged from the outlet at the bottom of the first reaction furnace 39 in the form of a hard residual of a carbon material. Then 70 parts by weight of the above decomposition gas was not condensed but directly introduced into the second condenser 44. Most of the decomposition gas was condensed, but 15 parts by weight of the decomposition gas remained in a non-condensed gas form. Of the condensed portion, a portion of 10 parts by weight was not liquefied but solidified. In the second condenser 44, complete choking had not occurred but a portion of the decomposition product had adhered to the inner wall surface of the condenser. It is considered that this adhesion resulted in deterioration of the condensation efficiency and an increase of the non-condensed gas portion. The recovery container 48 recovered was 45 parts by weight of oil.

According to GC-MS analysis of the recovered oil, no organic chlorine-containing compound was detected. However, the oil was composed of hydrocarbon compounds having 4 to 32 carbon atoms and contained non-decomposed plasticizer agent.

The above result shows that omission of the secondary decomposition in a pressurized atmosphere makes the oil product heavy.

(Experiments 102)

The extruder 38 and the first condenser 41 were removed from the decomposition apparatus 37 of FIG. 5, and the decomposition operation of Experiments 101 was repeated under the same reaction conditions, excepting that the melting/kneading operation by the extruder 38 and the condensation operation by the first condenser 41 were omitted.

As a result of the above operation, 80 parts by weight of decomposition gas was produced in the first reaction furnace, and the rest (20 parts by weight) was discharged from the outlet at the bottom of the first reaction furnace 39 in the form of a carbon residue. Then 80 parts by weight of the above decomposition gas was not condensed but directly introduced into the second condenser 44. Half of the decomposition gas was condensed, but 30 parts by weight of the decomposition gas remained in a non-condensed gas form. Of the condensed portion, a portion of 10 parts by weight was not liquefied but solidified. The recovery container 48 recovered was 40 parts by weight of oil.

According to GC-MS analysis of the recovered oil, about 2% organic chlorine-containing compound was detected. However, the oil was identified as corresponding to saturated paraffinic hydrocarbon compounds having 4 to 32 carbon atoms and contained non-decomposed plasticizer agent.

TABLE 7

|  |  | Experiment No. | | | | |
| --- | --- | --- | --- | --- | --- | --- |
|  |  | 98 | 99 | 100 | 101 | 102 |
| amount (pbw) | mixed waste plastic | 100 | 100 | 100 | 100 | 100 |
|  | sodium hydroxide | 5 | 30 | — | — | — |
|  | water | 1 | 5 | — | — | — |
| application | extruder | used | — | used | used | — |
|  | 1st condenser & 2nd reaction furnace | used | used | used | — | — |
| recovery (pbw) | oil | 60 | 60 | 60 | 45 | 40 |
|  | water | 1 | 15 | — | — | — |
|  | HCl | 20 | — | 20 | 20 | — |
|  | residue | 15 | 50 | 10 | 10 | 20 |
|  | gas | 10 | 10 | 10 | 15 | 30 |
|  | adhered product | — | — | — | 10 | 10 |
| quality of oil | carbon number | 4-18 | 4-18 | 4-18 | 4-32 | 4-32 |
|  | organic Cl | ND | ND | ND | ND | 2% | note)
ND: not detected

As described above, with the method and apparatus for pyrolytic decomposition of the present invention, fuel oil of high quality can be easily and efficiently produced from the waste plastic material with. Therefore, the industrial value of the present invention is extremely large.

According to the present invention, even if the waste plastic material contains PVC resin, the recovered oil is of high quality and with no chlorine element. As a result, operation for the separation of PVC resin from the waste plastic material to be pyrolytically decomposed can be omitted. Therefore, it is possible to realize a practical and economically advantageous recycling use of the waste plastic materials with use of the present invention.

Finally, it must be understood that the invention is in no way limited to the above embodiments and that many modifications may be made on the above embodiments without departing from the scope of the invention as defined by the appended claims,

What is claimed is:

1. A method of pyrolytically decomposing plastic, comprising the steps of:

thermally decomposing plastic in a pressurized atmosphere to produce a pyrolysis product in the form of gas;

cooling the pyrolysis product obtained at the thermally decomposing step so that the pyrolysis product is separated into a first fraction containing a first constituent and a second fraction being heavy relative to the first fraction, by condensation of the second fraction;

feeding back the second traction separated at the cooling step to the thermally decomposing step so that the second fraction is further thermally decomposed; and recovering the first constituent by collecting the first fraction.

2. The pyrolytic decomposition method of claim 1, wherein at the thermally decomposing step, the plastic is thermally decomposed in the presence of an alkali material which is selected from the group consisting of alkali metal hydroxides and alkaline earth metal hydroxides.

3. The pyrolytic decomposition method of claim 2, wherein the plastic includes polyvinyl chloride.

4. The pyrolytic decomposition method of claim 1, wherein a gauge pressure of the pressurized atmosphere at the thermally decomposing step is within a range of 1 $kgf/cm^2$ to 10 $kgf/cm^2$.

5. The pyrolytic decomposition method of claim 1, wherein the plastic is heated at a temperature within a range of 300° C. to 600° C. at the thermally decomposing step, and wherein the pyrolysis product is cooled to a temperature within a range of 200° C. to 350° C. at the cooling step.

6. The pyrolytic decomposition method of claim 1, wherein the plastic is decomposed in the presence of water at the thermally decomposing step.

7. The pyrolytic decomposition method of claim 1, wherein the plastic is decomposed in the presence of a medium which is in liquid state at the thermal decomposition step and which is substantially inert to the plastic and the pyrolysis product.

8. The pyrolytic decomposition method of claim 1, wherein the plastic, at the thermally decomposing step, is decomposed in the presence of a catalyst which is selected from the group consisting of nickel oxide, ferric oxide, cobalt (III) oxide, copper oxide, manganese dioxide, silica, zirconia and titania.

9. The pyrolytic decomposition method of claim 1, wherein the plastic, at the thermally decomposing step, is decomposed in the presence of silicon dioxide.

10. The pyrolytic decomposition method of claim 1, wherein the pyrolysis product contains an olefin compound, and the pyrolytic decomposition method further comprises the step of:

transforming the olefin compound contained in the pyrolysis product into an aromatic compound or a saturated compound.

11. The pyrolytic decomposition method of claim 10, wherein at the transferring step, the olefin compound is transformed in the presence of a catalyst which is selected from the group consisting of active alumina and zeolite.

* * * * *